United States Patent
Chai et al.

(10) Patent No.: US 12,094,073 B2
(45) Date of Patent: Sep. 17, 2024

(54) CROSS-MODAL SHAPE AND COLOR MANIPULATION

(71) Applicant: Snap Inc., Santa Monica, CA (US)

(72) Inventors: Menglei Chai, Los Angeles, CA (US); Sergey Tulyakov, Marina del Rey, CA (US); Jian Ren, Marina Del Ray, CA (US); Hsin-Ying Lee, San Jose, CA (US); Kyle Olszewski, Los Angeles, CA (US); Zeng Huang, Los Angeles, CA (US); Zezhou Cheng, Hadley, MA (US)

(73) Assignee: SNAP INC., Santa Monica, CA (US)

( * ) Notice: Subject to any disclaimer, the term of this patent is extended or adjusted under 35 U.S.C. 154(b) by 90 days.

(21) Appl. No.: 17/814,391

(22) Filed: Jul. 22, 2022

(65) Prior Publication Data

US 2023/0386158 A1    Nov. 30, 2023

Related U.S. Application Data

(60) Provisional application No. 63/365,568, filed on May 31, 2022.

(51) Int. Cl.
*G06T 19/20* (2011.01)
*G06T 9/00* (2006.01)
(Continued)

(52) U.S. Cl.
CPC .............. *G06T 19/20* (2013.01); *G06T 17/00* (2013.01); *G06T 2219/2012* (2013.01); *G06T 2219/2021* (2013.01)

(58) Field of Classification Search
CPC . G06T 17/00; G06T 19/20; G06T 2219/2021; G06T 2219/2012; G06T 15/00;
(Continued)

(56) References Cited

U.S. PATENT DOCUMENTS

| | | | |
|---|---|---|---|
| 7,714,867 B2 * | 5/2010 | Doi | G06T 17/10 345/620 |
| 2019/0347865 A1 * | 11/2019 | Hackett | G06T 13/20 |
| 2020/0175757 A1 | 6/2020 | Li et al. | |

FOREIGN PATENT DOCUMENTS

| | | |
|---|---|---|
| EP | 3671660 | 6/2020 |
| EP | 3958182 | 2/2022 |
| WO | WO-2023235110 A1 | 12/2023 |

OTHER PUBLICATIONS

"International Application Serial No. PCT/US2023/021311, International Search Report mailed Aug. 25, 2023", 6 pgs.
(Continued)

*Primary Examiner* — Wesner Sajous
(74) *Attorney, Agent, or Firm* — SCHWEGMAN LUNDBERG & WOESSNER, P.A.

(57) ABSTRACT

Systems, computer readable media, and methods herein describe an editing system where a three-dimensional (3D) object can be edited by editing a 2D sketch or 2D RGB views of the 3D object. The editing system uses multi-modal (MM) variational auto-decoders (VADs)(MM-VADs) that are trained with a shared latent space that enables editing 3D objects by editing 2D sketches of the 3D objects. The system determines a latent code that corresponds to an edited or sketched 2D sketch. The latent code is then used to generate a 3D object using the MM-VADs with the latent code as input. The latent space is divided into a latent space for shapes and a latent space for colors. The MM-VADs are trained with variational auto-encoders (VAE) and a ground truth.

19 Claims, 23 Drawing Sheets

(51) Int. Cl.
*G06T 11/00* (2006.01)
*G06T 17/00* (2006.01)

(58) Field of Classification Search
CPC ......... G06T 7/30; G06T 11/001; G06T 13/20; G06T 19/006; G06F 30/12–13; G06F 2111/02; G06F 2111/18; G06F 2111/20; G09G 5/02; G09G 2320/066; G06V 20/647; G06V 10/44; G06V 40/171; G06V 40/161; G06V 40/174; H04N 19/00; H04N 19/10; H04N 19/124; H04N 19/1341–36
See application file for complete search history.

(56) References Cited

OTHER PUBLICATIONS

"International Application Serial No. PCT/US2023/021311, Written Opinion mailed Aug. 25, 2023", 6 pgs.
Oin, Feiwei, "3D CAD model retrieval based on sketch and unsupervised variational autoencoder", Advanced Engineering Informatics, Elsevier, Amsterdam, NY, vol. 51, (Oct. 23, 2021), 13 pgs.
Wang, Lingjing, "Unsupervised Learning of 3D Model Reconstruction from Hand-Drawn Sketches", Multimedia, ACM, 2 Penn Plaza, Suite 701, NY, USA, (Oct. 15, 2018), 9 pgs.
Zezhou, Cheng, "Cross-Modal 3D Shape Generation and Manipulation", Arxiv.Org, Cornell University Library, 201 Olin Library Cornell University Ithaca, NY 14853, (Jul. 24, 2022), 18 pgs.

* cited by examiner

CROSS-MODAL SHAPE AND COLOR MANIPULATION

CLAIM OF PRIORITY

This application claims the benefit of priority to U.S. Provisional Application Ser. No. 63/365,568, filed May 31, 2022, which is incorporated herein by reference in its entirety.

TECHNICAL FIELD

Examples herein generally relate to editing the shape and color of three dimensional (3D) objects by editing two-dimensional (2D) sketches of the 3D objects. Specifically, but not limited to, methods and systems describe using multi-modal (MM) variational auto-decoders (VADs)(MM-VADs) with a shared latent space that enable editing 3D objects by editing 2D sketches of the 3D objects.

BACKGROUND

Often people have difficulty drawing and editing 3D objects. Editing programs are provided that enable user to directly edit or color 3D objects but often these programs do not enable the user to edit and color 3D objects without difficulty.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
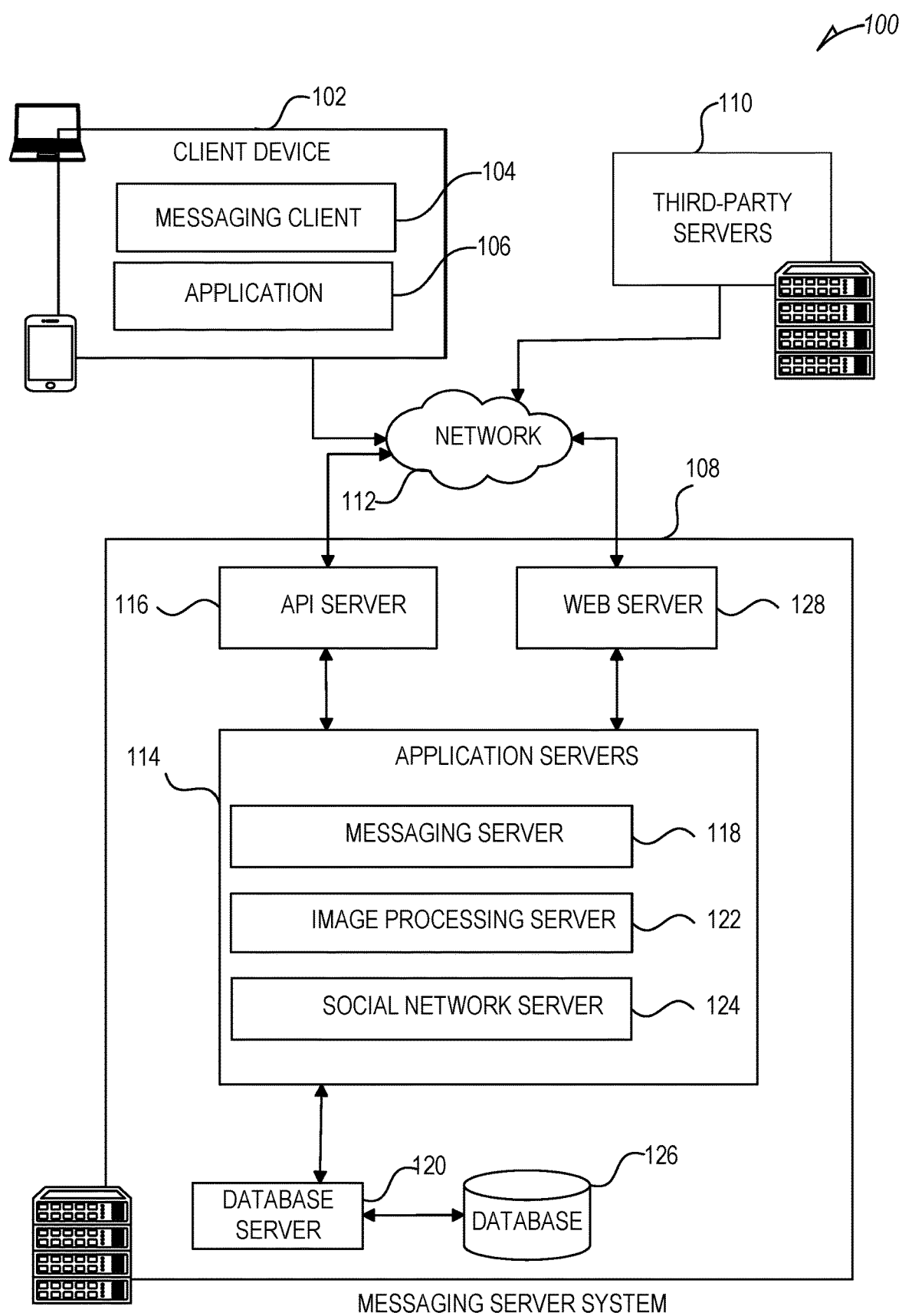
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples herein describe computer readable media, methods, and systems for editing and coloring 3D shapes 608 by editing and coloring 2D sketches 716 and 2D red, green, blue (RGB) views 714. An editing module 902 provides an editing program for a user to draw a 2D sketch 1902. The editing module 902 uses an MM generator 701 to determine a first latent code that can be used to generate the 2D sketch 1902 based on the MM generator 701 with the first latent code as input. The editing module 902 then uses the first latent code to generate a 3D shape 1 1904 and a 2D RGB view 1906 that correspond to the 2D sketch 1902.

The user can then edit the 3D shape 1 1904 by, for example, adding color to the 2D RGB view 1906. The editing module 902 uses an MM generator 701 to determine a second latent code that could be used to generate the 2D RGB view 1906 with the added color 1910 using the MM generator 701 with the second latent code as input. The editing module 902 then generates a new 3D shape 2 1908 using the second latent code.

The MM generator 701 enables the editing module 902 to determine changes to a 3D shape 1 1904 based on changes made to a 2D sketch 1902 or a 2D RGB view 1906 and enables the editing module 902 to determine a 3D shape 1 1904 corresponding to a 2D sketch 1902 drawn by the user.

A challenge is how to build and train the MM generator 701 so that 3D shapes 1 1904 can be edited with 2D sketches 1902 and 2D RGB views 1906. Examples address the challenge by using separate variational auto-decoders (VADs), $\mathcal{G}^C$ 607, $\mathcal{G}^S$ 712, and $\mathcal{G}^R$ 710, for each of the modalities of 3D Shapes 1 1904, 2D sketches 1902, and 2D RGB views 1906, respectively, where a shared latent space is used for all the VADs. Additionally, the VADs are trained with paired variational auto-encoders (VAEs) in conjunction with a ground truth of matched triplets 814 that include a 3D shape 816, a 2D RGB view 818, and a 2D sketch 820, which all correspond to a same object.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
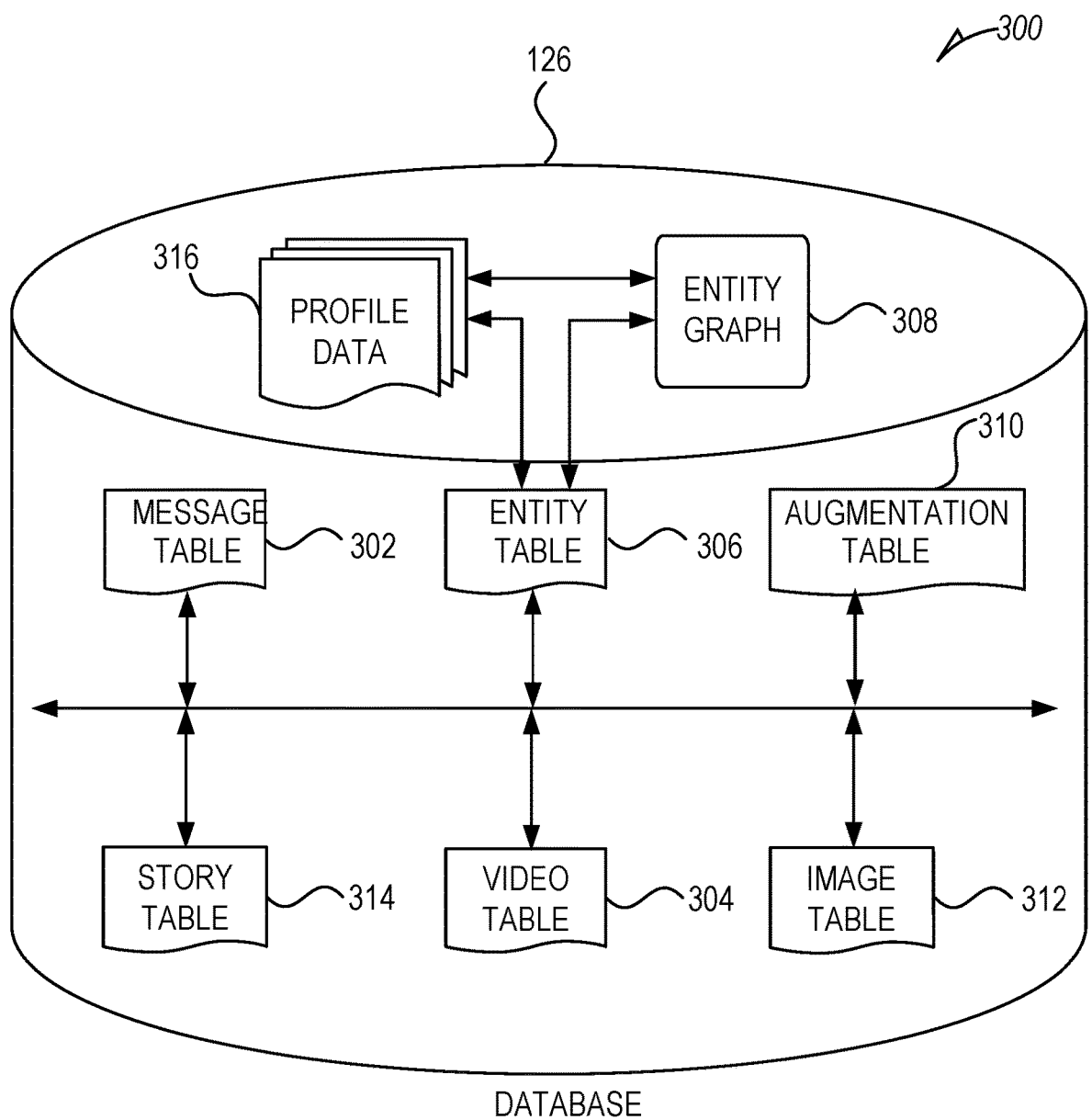
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
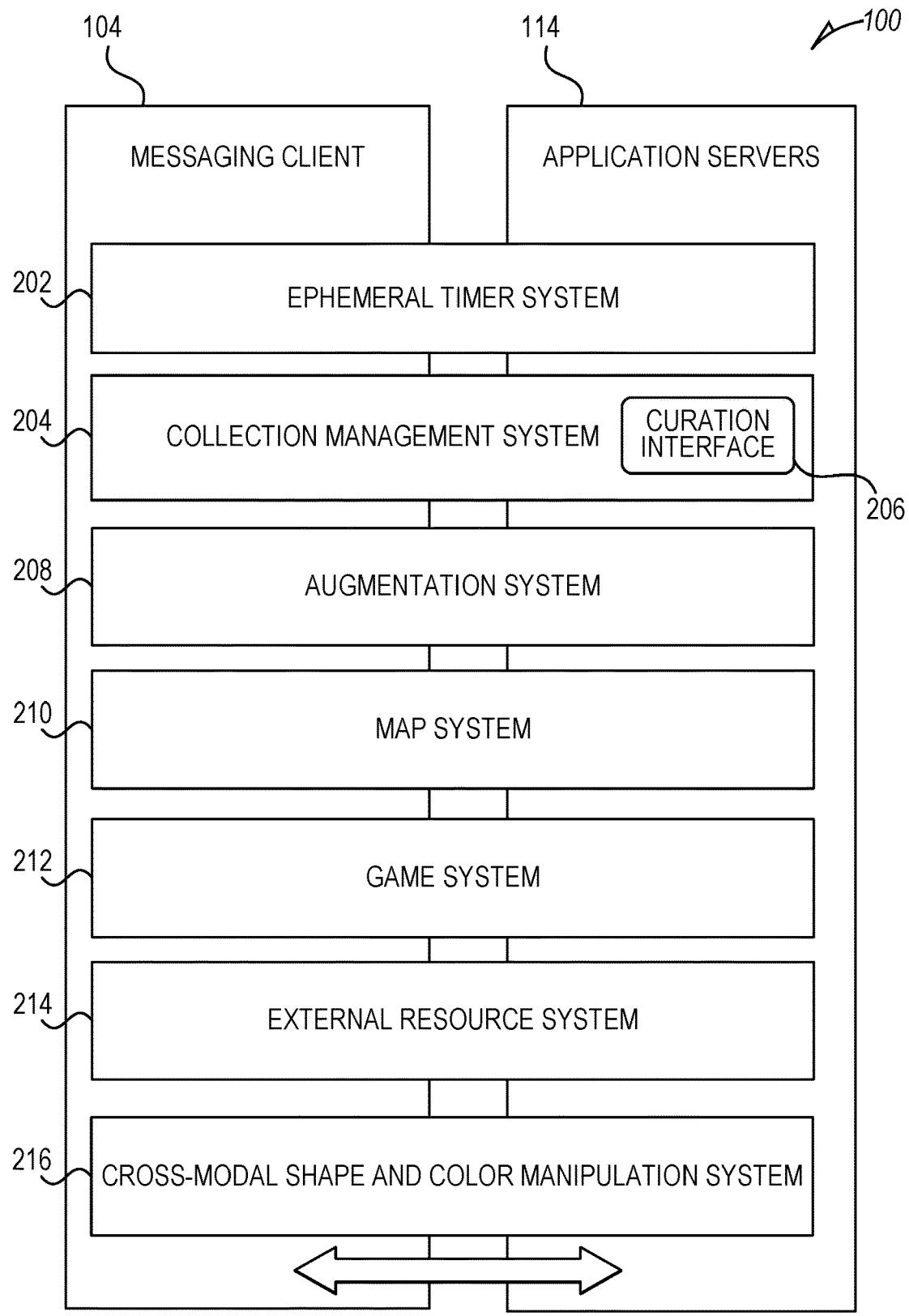
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a cross-modal shape and color manipulation system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The cross-modal shape and color manipulation system 216 provides functions and routines for performing cross-modal shape and color manipulation. The cross-modal shape and color manipulation system 216 provides the functions and routines as described herein and in FIGS. 6-20. The cross-modal shape and color manipulation system 216 is configured to train the MM encoder 824 and the MM generator 701. The cross-modal shape and color manipulation system 216 provides the functions for the user interface illustrated on the display 906. The display 906 is the display of the client device 102, in accordance with some examples. The cross-modal shape and color manipulation system 216 operates in conjunction with a client device 102 where the functionality is split between the cross-modal shape and color manipulation system 216 and the client device 102, in accordance with some examples.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular message, at least message sender data, message recipient (or receiver) data, and a payload. Further details regarding information that may be included in a message and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such methods, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with the use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcasted by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
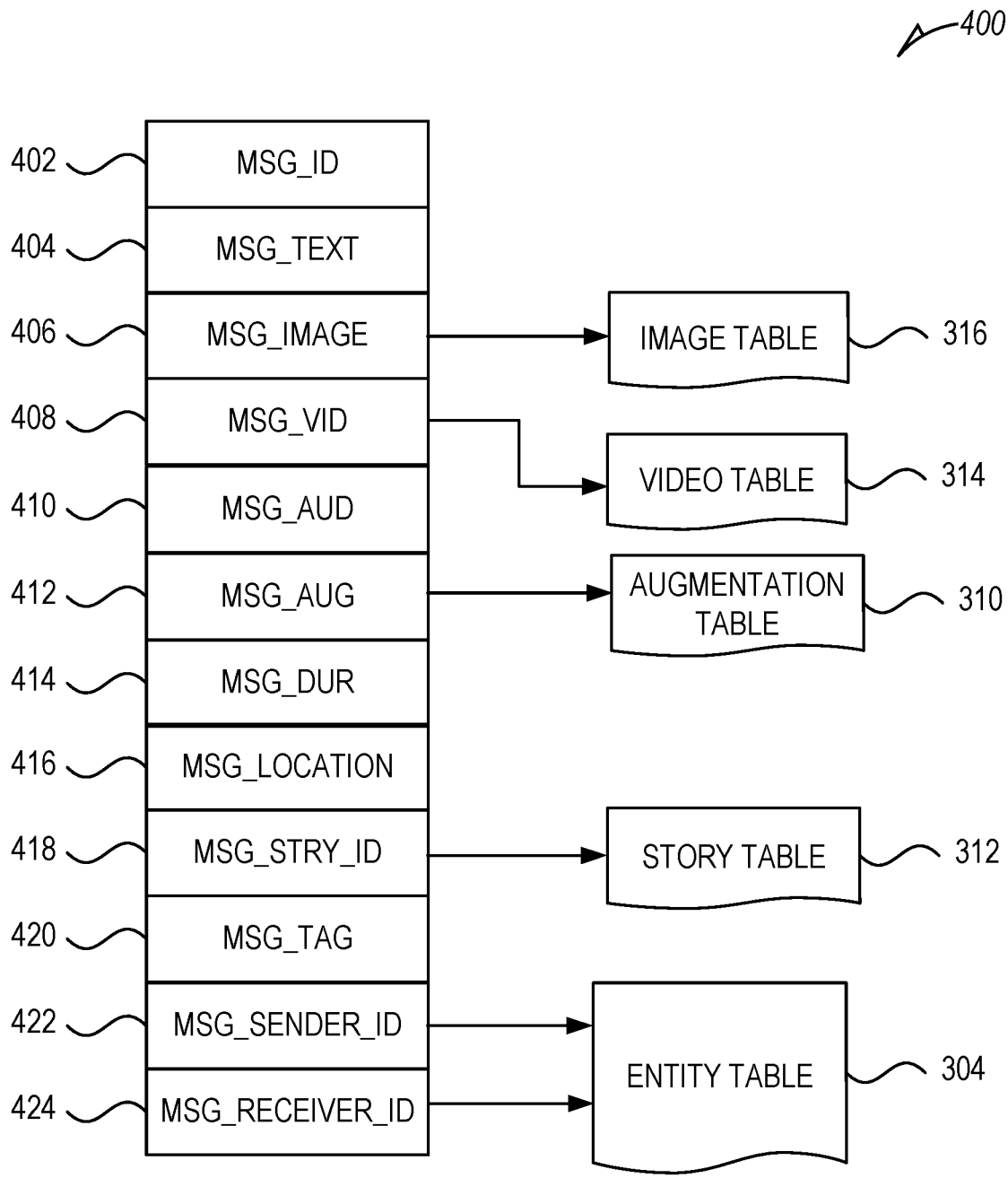
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
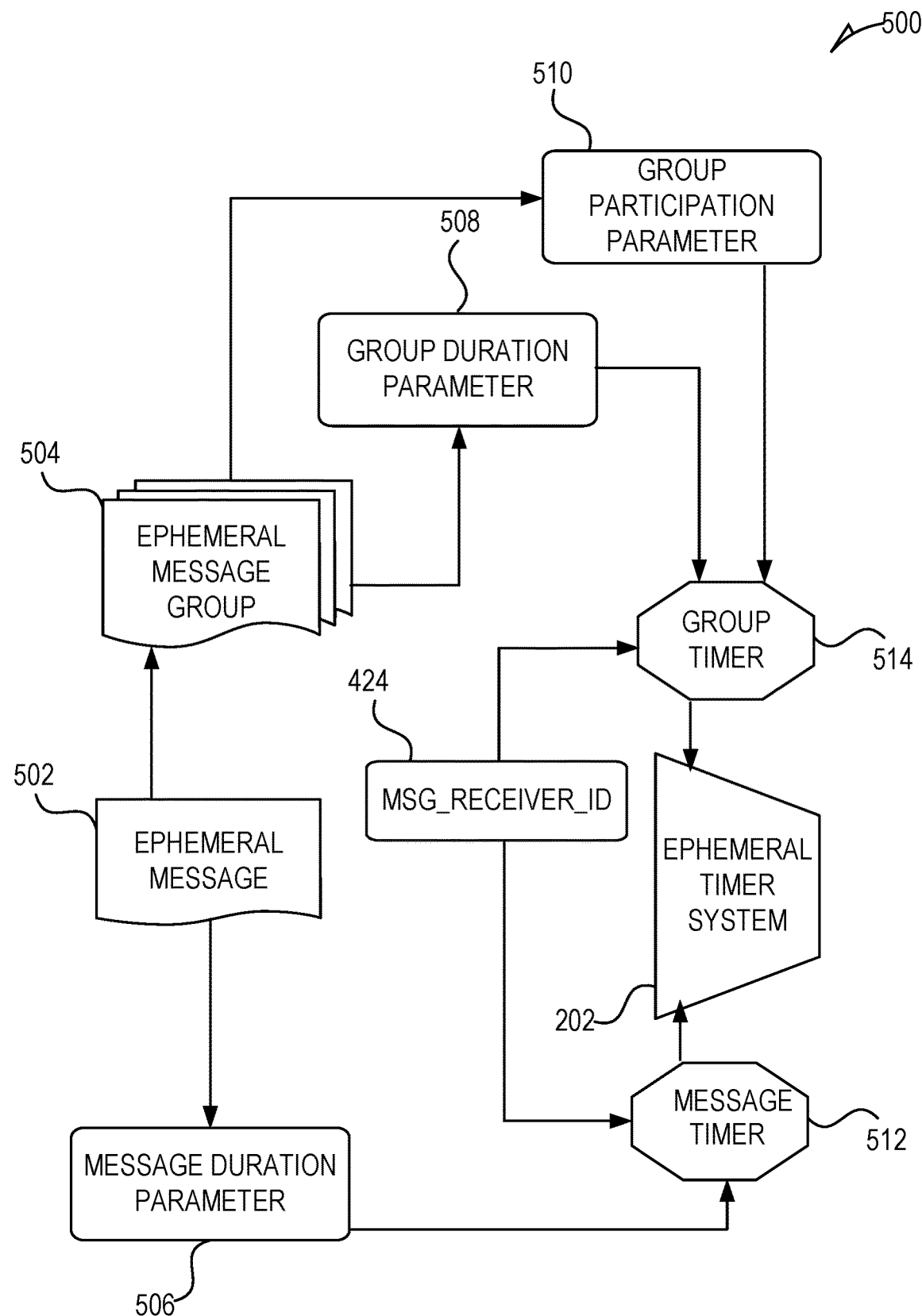
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Cross-Modal Shape and Color Manipulation

Figure 6:
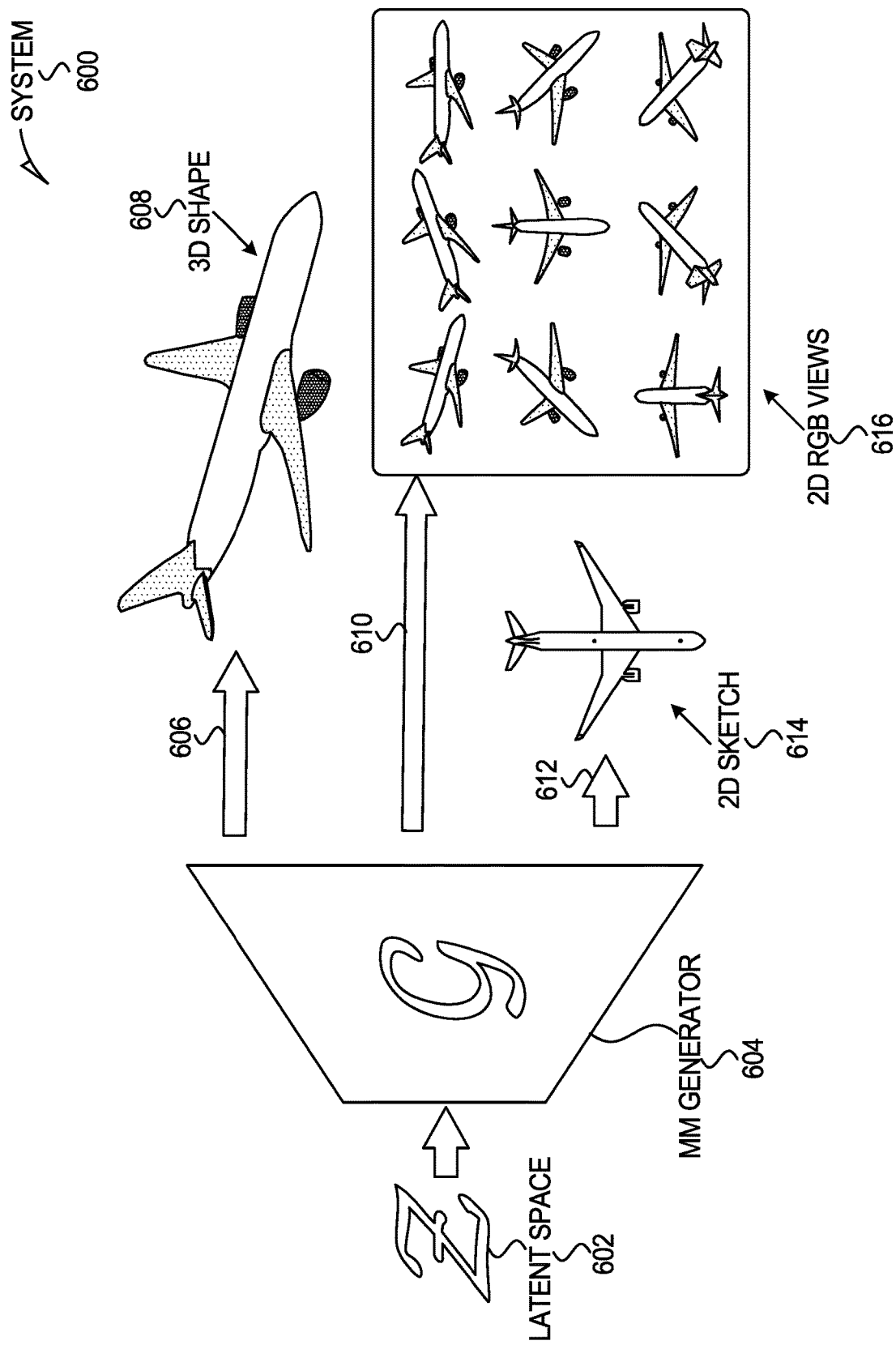
FIG. 6 illustrates a system for cross-modal shape and color manipulation, in accordance with some examples.

FIG. 6 illustrates a system 600 for cross-modal shape and color manipulation, in accordance with some examples. The system 600 takes a value, z, from latent space (Z) 602 and uses z as input to multi-modal (MM) generator 604 to generate 606, 610, 612, a three-dimensional (3D) shape 608, 2D RGB views 616, and a two-dimensional (2D) sketch 614, respectively. The 3D shape 608, 2D RGB views 616, and 2D sketch 614 represent a same object, which in this case is an airplane. The system 600 trains the MM generator 604 with a ground truth of triplets or pairs of 3D shapes 608, 2D RGB views 616, and 2D sketches 614 where the latent space 602 is shared among separate MM variational auto-decoders (VADs) that comprise the MM generator 604. In some examples, the 2D RGB views 616 are termed 2D color views.

Figure 7:
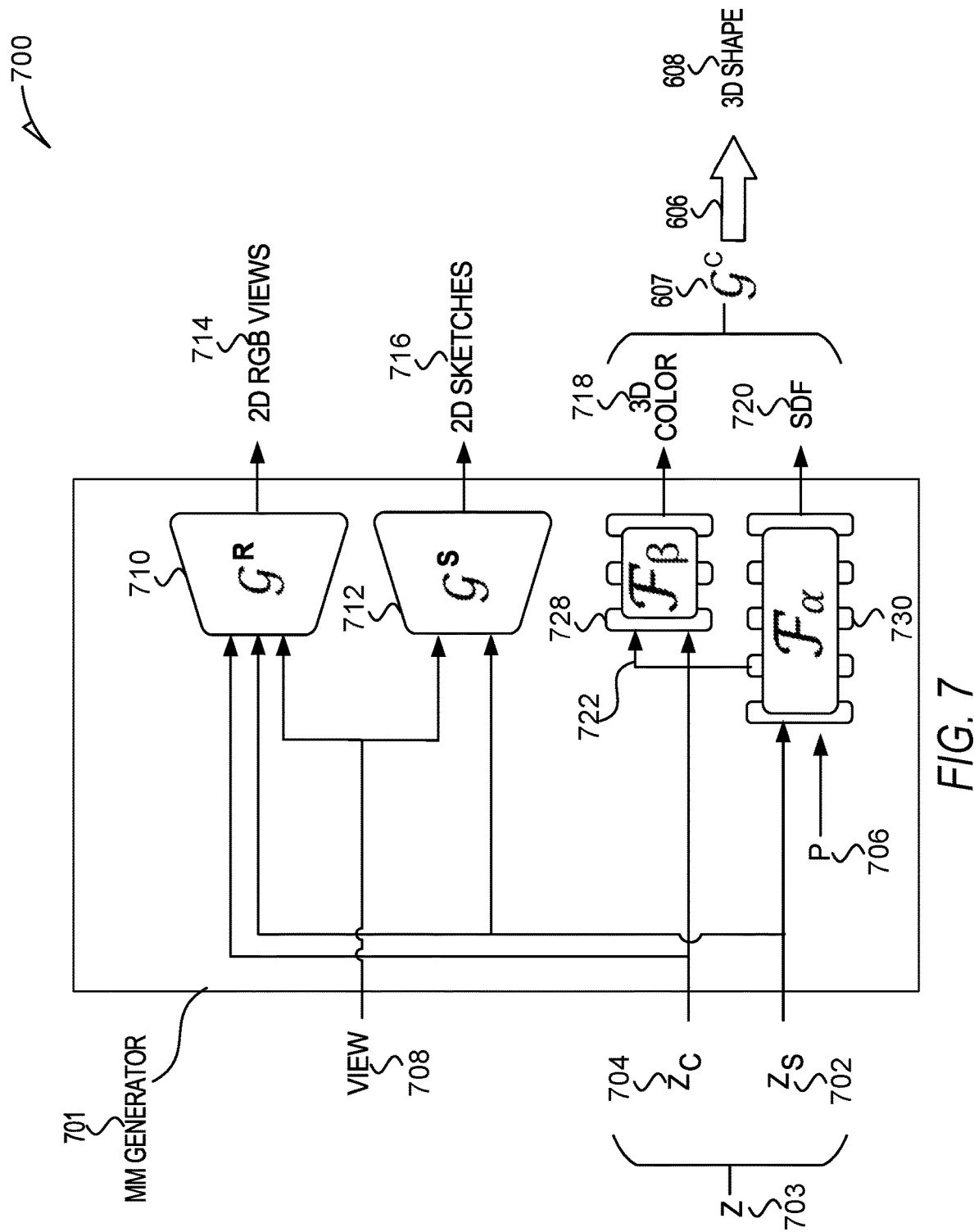
FIG. 7 illustrates a system for cross-modal shape and color manipulation, in accordance with some examples.

FIG. 7 illustrates a system 700 for cross-modal shape and color manipulation, in accordance with some examples. The MM generator 701 is an example of the MM generator 604 of FIG. 6. $\mathcal{F}_\alpha$ 730, $\mathcal{F}_\beta$ 728, $G^R$ 710, and $G^S$ 712 are variational auto-decoders (VADs). The VADs share a latent space Z 602. The latent space Z 602 is composed of a latent space for color (C) $Z_C$ 704 and a latent space for shape (S) $Z_S$ 704. Each latent code $z$ 703 $\in Z$ 602 is given by Equation (1): $z = z_S \oplus z_C$, where $z_S$ 702 is a shape latent code with $z_S$ 702 $\in Z_S$, and where $z_C$ 704 is a color latent code with $z_C$ 704 $\in Z_C$, and $\oplus$ denotes a bit concatenation operator. P 706 is the 3D coordinates with $P \in \mathbb{R}^3$ or a coordinate of three real numbers. The system 700 generates the output of $\mathcal{F}_\alpha$ 730 based on Equation (2).

Equation (2): $\mathcal{F}_\alpha(z_S \oplus p)$=signed distance fields (SDFs). One skilled in the art would recognize that other representations may be used other than SDFs as the output of $\mathcal{F}_\alpha$ 730 such as voxels, meshes, point clouds, and so forth. The system 700 generates the output of $\mathcal{F}_\beta$ 728 based on Equation (3).

Equation (3): $\mathcal{F}_\beta(z_S \oplus z_C^K)$=3D color. The term $z_C^K$ 722 indicates that the kth layer of $\mathcal{F}_\alpha$ 730 is fed into $\mathcal{F}_\beta$ 728 as input. The system 700 combines the SDFs 720 with the 3D color 718 to generate or render the 3D shape 608 by $\mathcal{G}^e$ 607, which represents the generation of the 3D shape 608. The system 700 indicates either the training module 810 or the editing module 902. The system 700 generates the 3D shape 608 based on Equation (4).

Equation (4): $\mathcal{G}^e(z_S \oplus z_C \oplus p) = \{\mathcal{F}_\alpha(z_S \oplus p), \mathcal{F}_\beta(z_S \oplus z_C^K)\}$. The $\mathcal{F}_\alpha$ 730 and $\mathcal{F}_\beta$ 728 are multi-layer perceptrons (MLPs) or feed-forward fully-connected neural networks with eight layers and three layers, respectively, in accordance with some examples. The $\mathcal{G}^S$ and $\mathcal{G}$ are fully connected neural networks with a fixed number of layers, in accordance with some examples. Different architectures may be used for $\mathcal{F}_\alpha$ 730, $\mathcal{F}_\beta$ 728, $\mathcal{G}^S$, and $\mathcal{G}$ such as a different number of layers or the use of convolutional layers, up sampling layers, down-sampling layers, cross-connected layers, and so forth. The system 700 determines the 2D sketches 716 based on Equation (5). The system 700 determines the 2D RGB views 714 based on Equation (6). The 2D RGB views 714 are termed 2D color views, in accordance with some examples.

Equation (5): $\mathcal{G}^S = (z_S \oplus v) = $ 2D sketches 716, where the shape code $z_S$ 702 and view (v) 708 are inputs to $\mathcal{G}^S$ 712 and the 2D sketches 716 are the outputs. Equation (6): $\mathcal{G}^R = (z_C \oplus v) = $ 2D RGB views 714, where the color code $z_C$ 704 and v 708 are inputs to $\mathcal{G}^R$ 710 and the 2D RGB views 714 are the outputs. The system 700 trains $\mathcal{G}^S$ 712 and $\mathcal{G}^R$ 610 with different views 708 associated with the ground truth or training data so that a view 708 value is associated with an orientation of the 2D RGB views 616 or an orientation of the 2D sketches 614.

Figure 8:
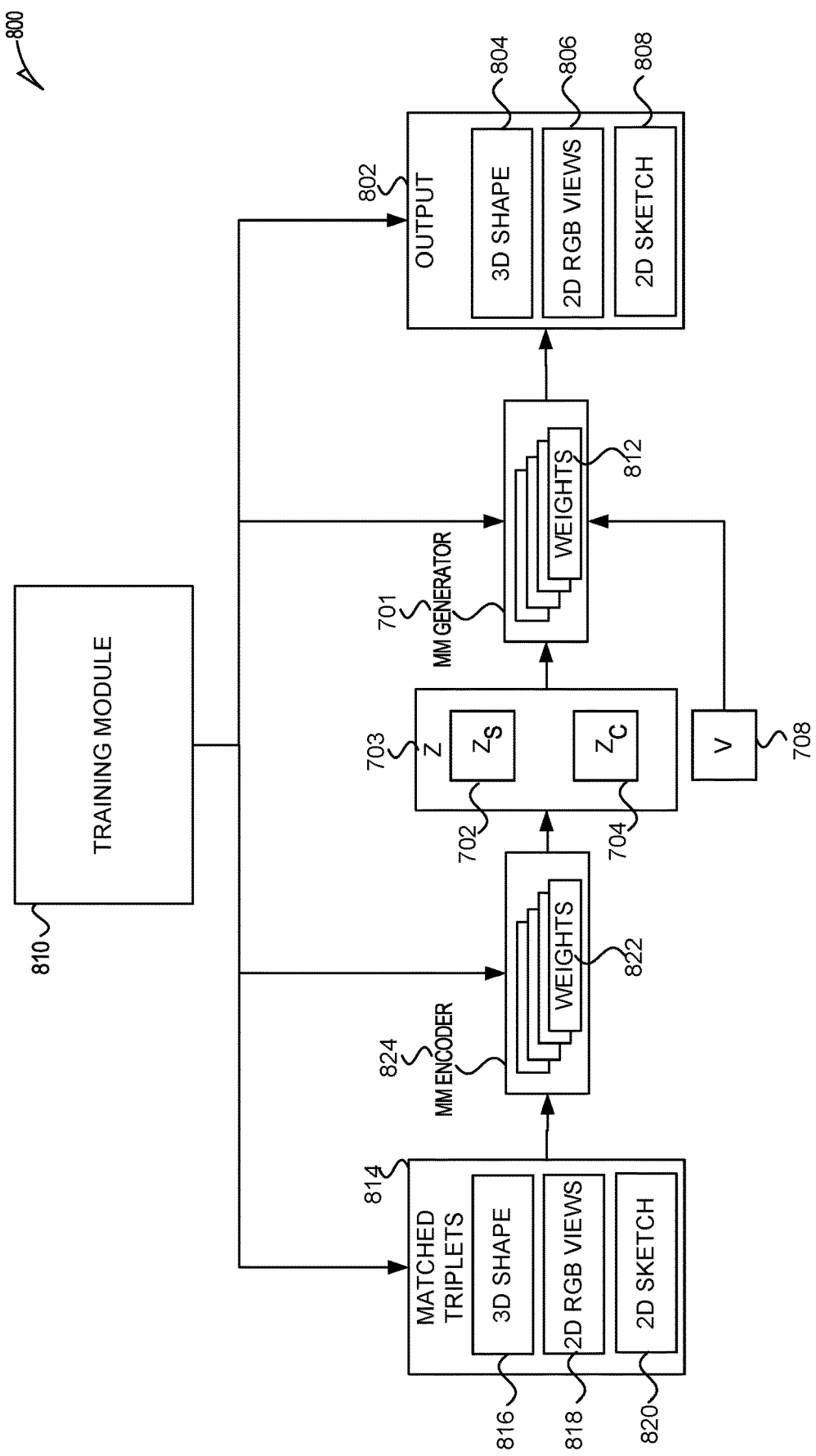
FIG. 8 illustrates a system for training an MM generator, in accordance with some examples.

FIG. 8 illustrates a system 800 for training an MM generator 701, in accordance with some examples. The MM encoder 824 is similar to the MM generator 701 where the MM encoder 824 is a variational auto-encoder (VAE) with four components that are encoders rather than decoders, in accordance with some examples. The MM encoder 824 generates from the 3D shapes 816, the 2D RGB views 818, and the 2D sketches 820, z 703, which is composed of $z_S$ 702 and $z_C$ 704. In some examples, v 708 is generated by the MM encoder 824.

The training module 810 uses one of a 3D shape 816, a 2D RGB view 818, or a 2D sketch 820 of the matched triplets 814 as input to the MM encoder 824 with parameters or weights 822. The output of the MM encoder 824 is a z 703 and, optionally, a v 708.

The z 703 and, optionally, the v 708 are input to the MM generator 701 to generate a 3D shape 804, a 2D RGB view 806, or a 2D sketch 808 of the output 802. The generated 3D shape 804, a 2D RGB view 806, or a 2D sketch 808 is then compared with the matched triplet 814 that was used as input to the MM encoder 824.

For example, if the training module 810 uses a 3D shape 816 as input to the MM encoder 824 to generate a z 703 and then uses the z 703 as input to the MM generator 701 to generate the 3D shape 804, then 3D shape 804 is compared with 3D shape 816 to determine a loss, which is then backpropagated through the MM generator 701, z 703, and/or the MM encoder 824 to adjust the weights 812, the value of z 703, and/or the weights 822, respectively, where typically only one set of weights 812, 822 is adjusted at a time while the other weights 812, 822 are frozen or remain static.

In some examples, the matched triplets 814, are termed a ground truth. In some examples, the matched triplets 814 are constructed from available databases of objects. The 3D shapes 816 are represented with SDF, which is a representation that is sampled 3D points of the object with a signed distance from an object surface. The 3D points that are greater than a threshold from the object surface are assigned a background color such as white and 3D points that are not greater than the threshold are assigned a color of a nearest surface point. For 2D sketches 820 and 2D RGB views 818, contours are used to generate the 2D sketches 820 and 2D RGB views 818 from the objects of the 3D shapes 816. In some examples, the colors of the 2D RGB views 818 are randomly assigned by segments of the object. The weights 822, the weights 812, z 703, and v 708 are termed model parameters.

The training module 810 trains model parameters based on maximizing the Evidence Lower Bound (ELBO) given by Equation (7). Equation(7): $V(\phi, \theta | x) = -KL(q_\phi(z|x) \| p(z)) + E_{q_\phi(z|x)}[\log p_\theta(x|z)]$, where $\phi$ are parameters of the MM encoder 824, $\theta$ are parameters of the MM generator 701, x is an observation variable, KL is the Kullback-Leibler divergence, z is a latent variable, p is the distribution, and E is an expectation. The term $q_\phi(z|x)$ approximates the posterior distribution p(z|x).

The term $-KL(q_\phi(z|x) \| p(z))$ lowers the relative entropy between the posterior distribution and the latent prior distribution p(z). The term $E_{q_\phi(z|x)}[\log p_\theta(x|z)]$ is a reconstruction loss determined by the training module 810 based on comparing one of the matched triplets 814 with one of the outputs 802 where the objective is for the outputs 802 to be as close as possible to the input of one of the matched triplets 814.

The training module 810 determines the term $q_\phi(z|x_i)$ based on Equation (8). Equation (8): $q_\phi(z\phi x_i) := \mathcal{N}(z_i; \mu_i, \Sigma_i)$, where $\mathcal{N}$ is a Gaussian distribution with mean, $\mu_i$, and standard deviation, $\Sigma_i$, and where $x_i$ is one of the matched triplets 814. The training module 810 uses re-parametrization technique in order to back-propagate the gradient of Equation (7) through z 703 during training. The re-parametrization technique adds an $\epsilon$ term to a $\phi$ term that represents the statistical portion of z 703 and where E remains static.

The training module 810 estimates the parameters $\phi$ of the MM encoder 824 by maximizing Equation (9) based on Equation (7) while the parameters $\phi$ of MM generator 701 are frozen. Equation (9): $\phi^* = \text{argmax}_\phi V(\phi | \theta, x_i)$.

The training module 810 learns three modalities x, w, and y where $V(\phi, \theta | x, w, y)$ is maximized based on Equation (10). For example, the x may be the 3D shapes 816, the w may be the 2D RGB views 818, and the y may be 2D sketches 820. Equation (10): $V(\phi, \theta | x, w, y) = -KL(q_\phi(z|x, w, y) \| p(z)) + E_{q_\phi(z|x,w,y)}[\log p_\theta(x, w, y|z)]$ where the symbols have the same meaning as in Equation (7) with the additional modalities of w and y where the latent space z is now shared by the three modalities. Additionally, $p_\theta(x, w, y\theta z) = P_{\theta(x)}(x|z) p_{\theta(w)}(w|z) p_{\theta(y)}(y|z)$, under the assumption that the three modalities x, w, and y are independent conditioned on latent variable z and where $\theta(x)$, $\theta(w)$, and $\theta(y)$ are the parameters such as the weights 812 of the different generators of the MM generator 701. For example, $\theta(x)$ are the weights of $\mathcal{F}_\alpha$ 730, $\theta(w)$ are the weights of $\mathcal{G}^R$ 610, and $\theta(y)$ are the weights of $\mathcal{G}^S$ 712. The weights 812 include all the weights of the MM generator 701.

The parameters $\phi$ of the approximate posterior distribution of z 703, $q_\phi(z|x, w, y)$, are learned by the training module 810 based on $\phi = \{\mu_i, \Sigma_i\}$ where the posterior distribution is assumed to be a multivariant Gaussian posterior distribution. The training module 810 learns the parameters $\phi$ by freezing the $\theta$ parameters of the MM generator 701 while maximizing the ELBO in accordance with Equation (11). Equation (11): $\phi^* = \text{argmax}_\phi V(\phi | \theta, x_i, w, y)$, where V is given by Equation (10). In some examples, the training module 810 is extended to learn more or fewer than three modalities at the same time.

The training module 810 uses as an objective function for training $\mathcal{G}^C$ 607 of $\mathcal{L}_1$, which is a measure of the loss between the input 3D shape 816 to the MM encoder 824 and the output 3D shape 804 from the MM generator 701. The training module 810 uses as an objective function for training $\mathcal{G}^S$ 712 of $\mathcal{L}^\delta$, which is a measure of the cross-entropy loss between input 2D sketch 820 to the MM encoder 824 and the output 2D sketch 808 from the MM generator 701. The training module 810 uses as an objective function for training $\mathcal{G}^\mathcal{R}$ 710 of $\mathcal{L}^R$, which is given by Equation (12).

Equation (12):

$$\mathcal{L}^R(z_i \oplus v, R_i) = \frac{1}{N} \sum_j^J 4^{-j} \left\| L^j(\mathcal{G}^R(z_i \oplus v)) - L^j(R_i) \right\|_1,$$

where $z_i$ is the concatenation of the shape and color codes for the target image $R_i$ (2D RGB views 806), N is the total number of pixels in the image $R_i$, J is the total number of levels of the Laplacian pyramid, which is three by default, and $L^j(x)$ is the j-th level in the Laplacian pyramid of image x. The objective function used by the training module 810 is given by Equation (13), which is Equation (10) with the following substitutions: x=C, which represents the 3D shapes 608; w=S, which represents the 2D sketches 716; and, y=R, which represents the 2D RGB views 714.

Equation (13): $V(\phi, \theta | C, S, R) = -KL(q_\phi(z|C,S,R) \| p(z)) + E_{q_\phi(z|C,S,R)}[\log p_\theta(C, S, R|z)]$, where the KL term regularizes the posterior distribution z 703 and the second term is factored into three components as given by Equation (14).

Equation (14): $E_{q_\phi(z|C, S, R)}[\log p_\theta(C, S, R|z)] = E_{q_\phi(z|C)}[\log p_\theta(C|*z)] + E_{q_\phi(z|C)}[\log p_\theta(S|z)] + E_{q_\phi(z|C)}[\log p_\theta(R|z)]$, which is equal to $\mathcal{L}^C + \mathcal{L}^S + \mathcal{L}^R$. Since the 3D shape 804 modality C contains all the information of the latent variable z, $q_\phi(z|C,S,R) = q_\phi(z|C)$. In some examples, optimizers are used with $\beta_1 = 0.9$ and $\beta_2 = 0.999$ to train the MM encoder 824 and the MM generator 701 based on Equation (13).

Figure 9:
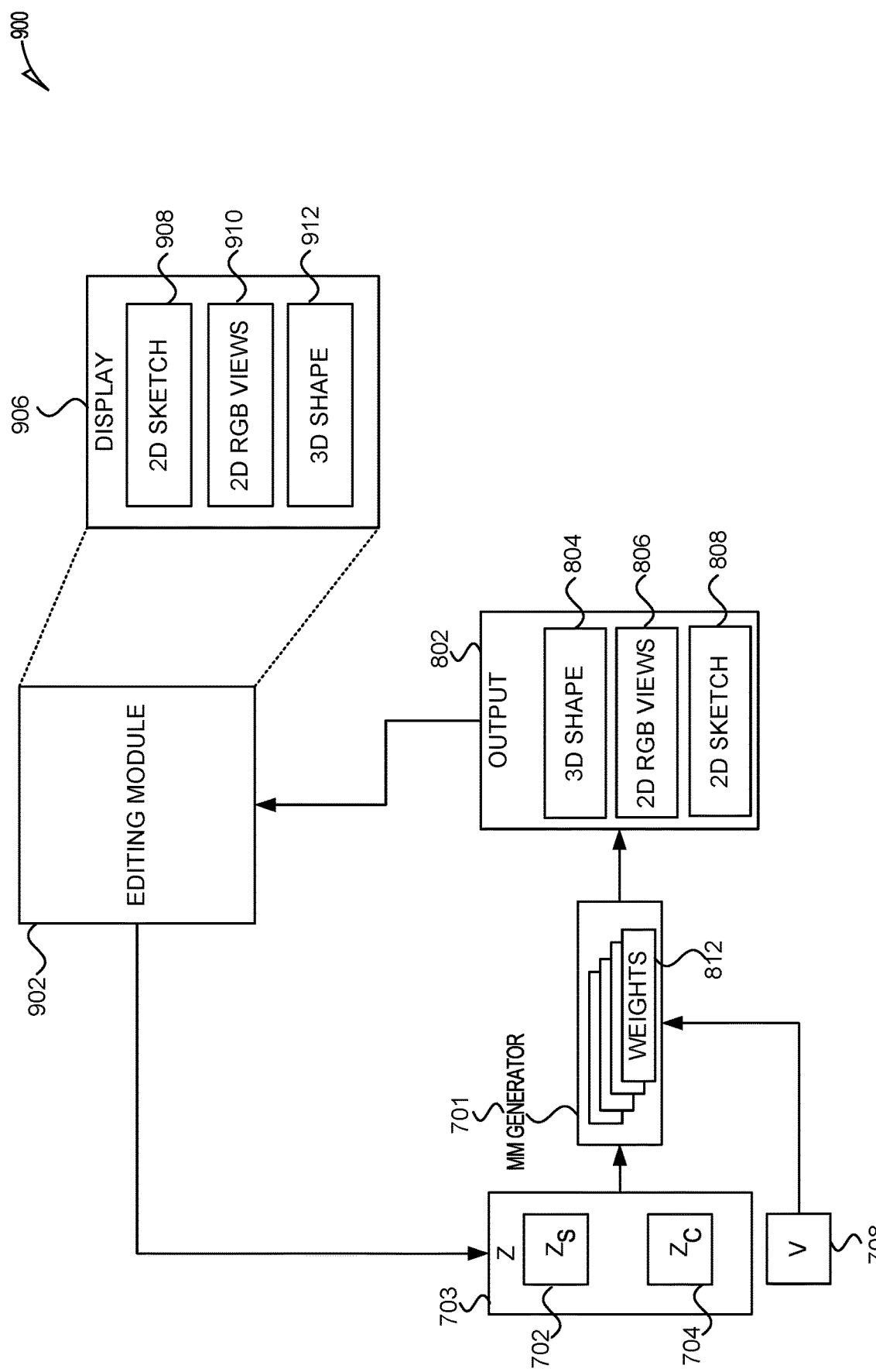
FIG. 9 illustrates a system for cross-modal shape and color manipulation, in accordance with some examples.

FIG. 9 illustrates a system 900 for cross-modal shape and color manipulation, in accordance with some examples. The editing module 902 enables a user to edit a modality of a 2D sketch 908, 2D RGB views 910, or 3D shape 912, and then determines corresponding changes to another modality. For example, a user may edit a 3D shape 912 by changing a 2D sketch 908. The editing module 902 determines the corresponding changes to the 3D shape 912 based on the changes to the 2D sketch 908.

The editing module 902 is configured to take a latent code $z_0$ and generate one or more of a 3D shape 804, 2D RGB views 806, and a 2D sketch 808 using the latent code $z_0$ as z 703 for input to the MM generator 701. For example, the editing module 902 generates the 3D shape 804 based on Equation (4), generates the 2D sketch 808 based on Equation (5), and generates one or more 2D RGB views 714 based on Equation (6).

A user then edits the 2D sketch 808 or a 2D RGB view 714. The editing module 902 then determines an updated latent code 2 based on Equation (15). Equation (15): $\hat{z} = \arg\min_z (\mathcal{L}_{EDIT}(\mathcal{G}^M(z) + e^M) + \mathcal{L}_{REG}(z))$, where modality (M) is S for 2D sketches 908 or R for 2D RGB views 910, $e^M$ is the 2D edits of the S or R, and $\mathcal{L}_{EDIT}$ is a loss that is determined by the editing module 902 based on Equation (16). Equation (16): $\mathcal{L}_{REG} = \gamma \max(\|z\|_2^2, \beta)$, where $\gamma$ and $\beta$ are parameters that control the strength of the loss. The editing module 902 then takes the determined $\hat{z}$ to determine a new 3D shape 912 and, optionally, a 2D RGB views 910, and/or 2D sketch 908 by using the $\hat{z}$ as input to the MM generator 701. In some examples, the editing module 902 iterates to find $\hat{z}$ and determines that $\hat{z}$ is to be used as the latent code for the 2D sketch 908 based on a difference between $\mathcal{G}^M(z)$ and $e^M$ being less than a first threshold or not transgressing the first threshold and/or $\mathcal{L}_{REG}(z)$ being less than a second threshold or not transgressing the second threshold.

Additionally, a user may draw a 2D sketch 908 or a 2D RGB view 910 and the editing module 902, then generates the 3D shape 912 by finding a latent code 2 corresponding to the 2D sketch 908 or the 2D RGB view 910, $x^M$, based on Equation (17).

Equation (17): $\hat{z} = \arg\min_z \mathcal{L}_{RECON}(\mathcal{G}^M(z), x^M) + \mathcal{L}_{REG}(z)$, where $\mathcal{L}_{REG}(z)$ may be determined based on Equation (16). In some examples, the editing module 902 iterates to find $\hat{z}$ and determines that 2 is to be used as the latent code for the 2D sketch 908 based on a difference between $\mathcal{G}^M(z)$ and $x^M$ being less than a first threshold or not transgressing the first threshold and/or $\mathcal{L}_{REG}(z)$ being less than a second threshold or not transgressing the second threshold.

In some examples, the editing module 902 generates multiple values for $\hat{z}$ and uses Equation (4) to generate multiple 3D shapes 912. For example, the editing module 902 may determine a value $\hat{z}$ based on Equation (15) or Equation (17). The editing module 902 may then generate new $\hat{z}$'s termed y's where each y is $\hat{z}$ with a delta added to one or more of the dimensions of $\hat{z}$. The editing module 902 then generates a 3D shape 804 for each of the y's and presents them on the display 906. The display 906 is the display of client device 102, in accordance with some embodiments. In this way, the user may be offered 3D shapes 804 that are near the 3D shape 804 generated using $\hat{z}$ within the latent space Z 602.

Additionally, based on several 2D images that represent a 3D shape such as an armchair or airplane, the editing module 902 based on Equation (18) learns a mapping function $h_\omega(z)$ that maps the prior distribution of the latent space z 703~$\hat{p}(z)$ to a new distribution. Equation (18): $h_\omega(z)$=new distribution. Where the new distribution of $h_\omega(z)$ aligns with the target data distribution x~p(x) of the 3D shape that is depicted by the several 2D images such as by 2D sketches 908 and/or the 2D RGB views 910. The editing module 902 generates the 2D sketches 908 based on Equation (5) with $h_\omega(z)$ rather than z 703 and the 2D RGB views 910 based on Equation (6) with $h_\omega(z)$ rather than z 703. The editing module 902 learns the mapping function $h_\omega(z)$ based on Equation (19):

$$\min_\omega \max_D E_{x \sim \hat{p}(x)}[\mathcal{D}(x)]$$

$-E_{z \sim p(z)}[\mathcal{D}(\mathcal{G}^M(h_\omega(z)))]$, where M is either S (Equation (5)) or R (Equation (6)), the mapping function $h_\omega(z)$ is learned with the weights 812 frozen and the output of the MM generator 701 being feed into a discriminator $\mathcal{D}$. In some examples, latent space z 703 is a first latent space and the mapping function $h_\omega(z)$ maps to a second latent space. The mapping function $h_\omega(z)$ maps a plurality of 2D sketches 908 to a same area of the second latent space so that the $h_\omega(z)$ codes are near one another within the second latent space.

Figure 10:
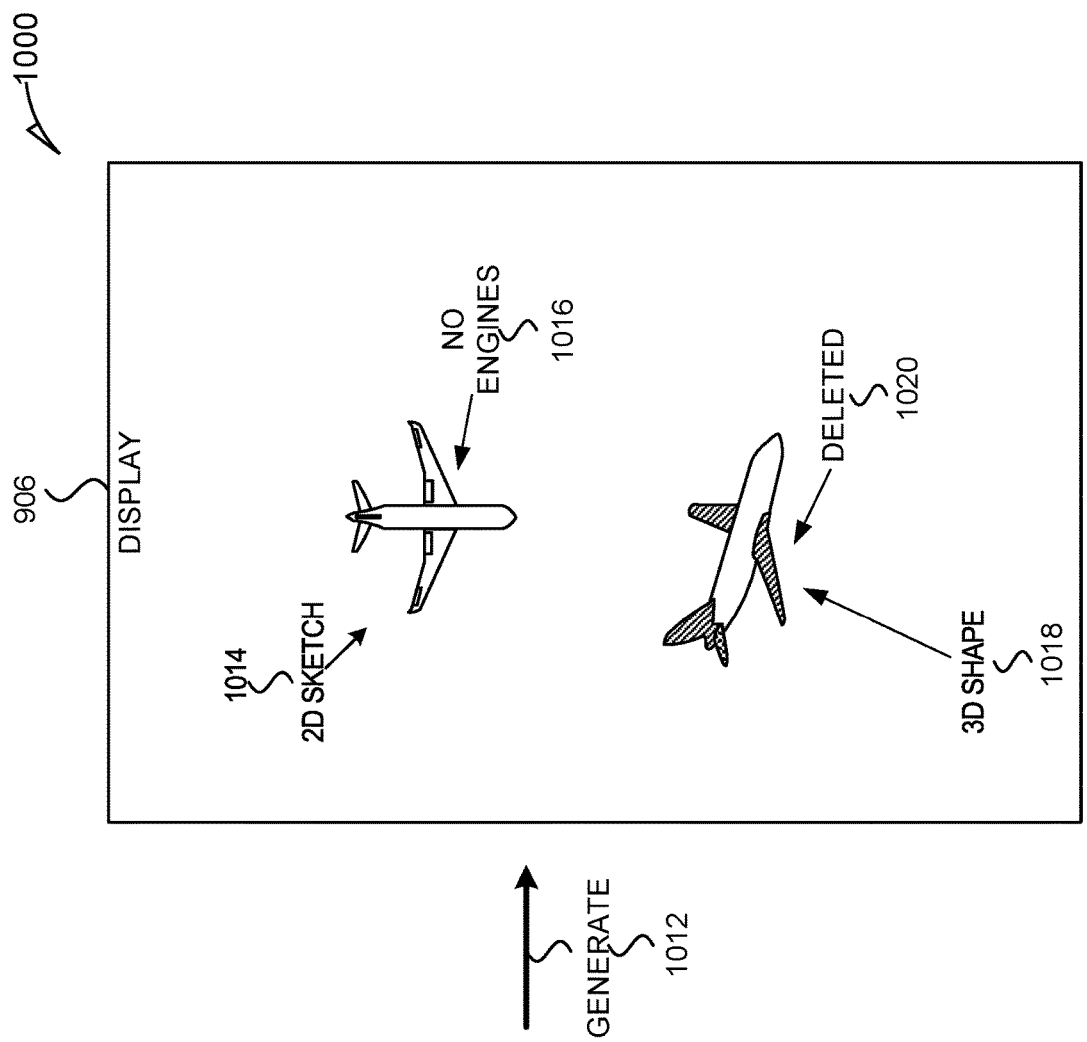
FIG. 10 illustrates an example of cross-modal shape and color manipulation, in accordance with some examples.
Figure 10:
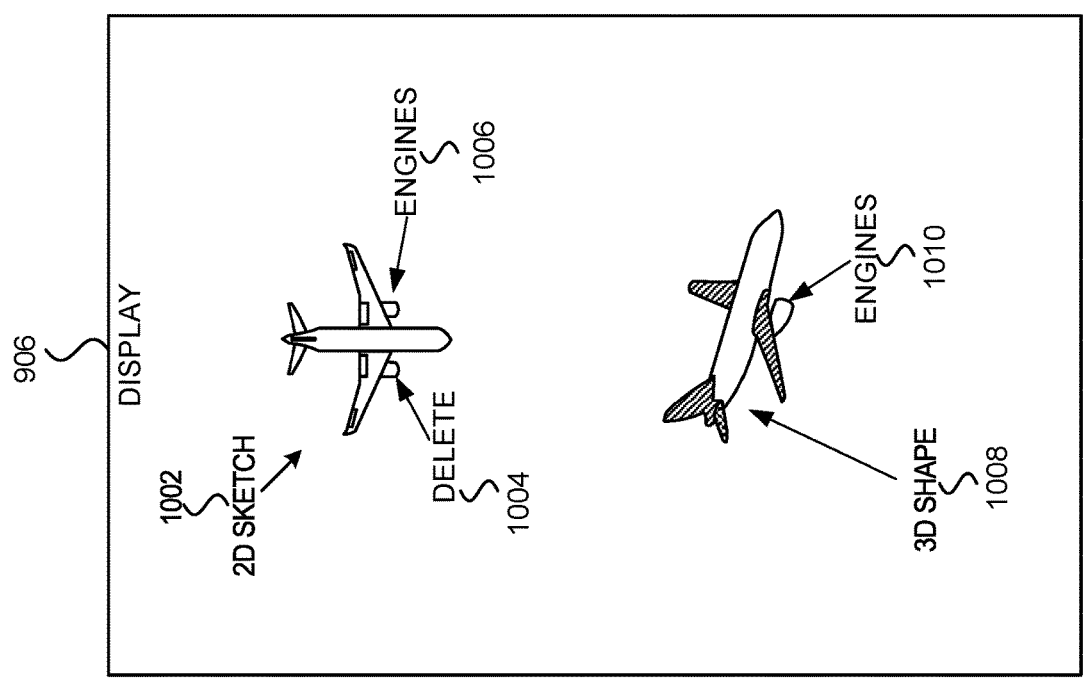

FIG. 10 illustrates an example 1000 of cross-modal shape and color manipulation, in accordance with some examples. In FIG. 10, the editing module 902 uses a latent code $z_0$ as z 703 to generate the 3D shape 1008 and the 2D sketch 1002. The 2D sketch includes engines 1006, which a user deletes 1004 using an editing program provided by the editing module 902. The 3D shape 1008 generated 1012 by the editing module 902 based on $z_0$ includes the engines 1010. After the user deletes 1004 the engines 1006, the 2D sketch 1014 has no engines 1016. In some examples, the editing module 902 determines $\hat{z}$ based on Equation (13) and then generates the 3D shape 1018 based on Equation (4). In some examples, when additional 2D sketches 1002 are presented of airplanes, the editing module 902 learns the mapping function $h_\omega(z)$ based on Equation (17) and uses $h_\omega(z)$ for z to determine $\hat{z}$ based on Equation (13). The editing module 902 then generates the 3D shape 1018 based on Equation (4) with z substituted by $h_\omega(z)$ where the engines are deleted 1020. The editing module 902 enabled the user to edit the 3D shape 1008 by editing the 2D sketch 1002.

Figure 11:
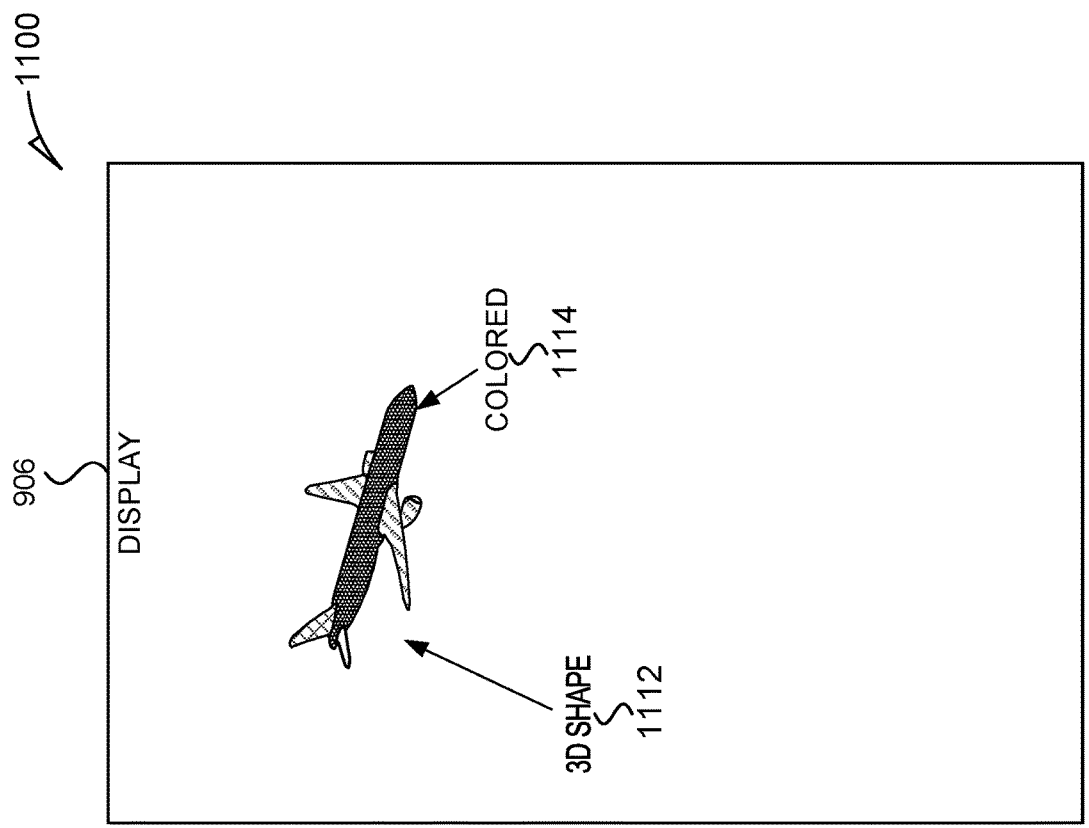
FIG. 11 illustrates an example of cross-modal shape and color manipulation, in accordance with some examples.
Figure 11:
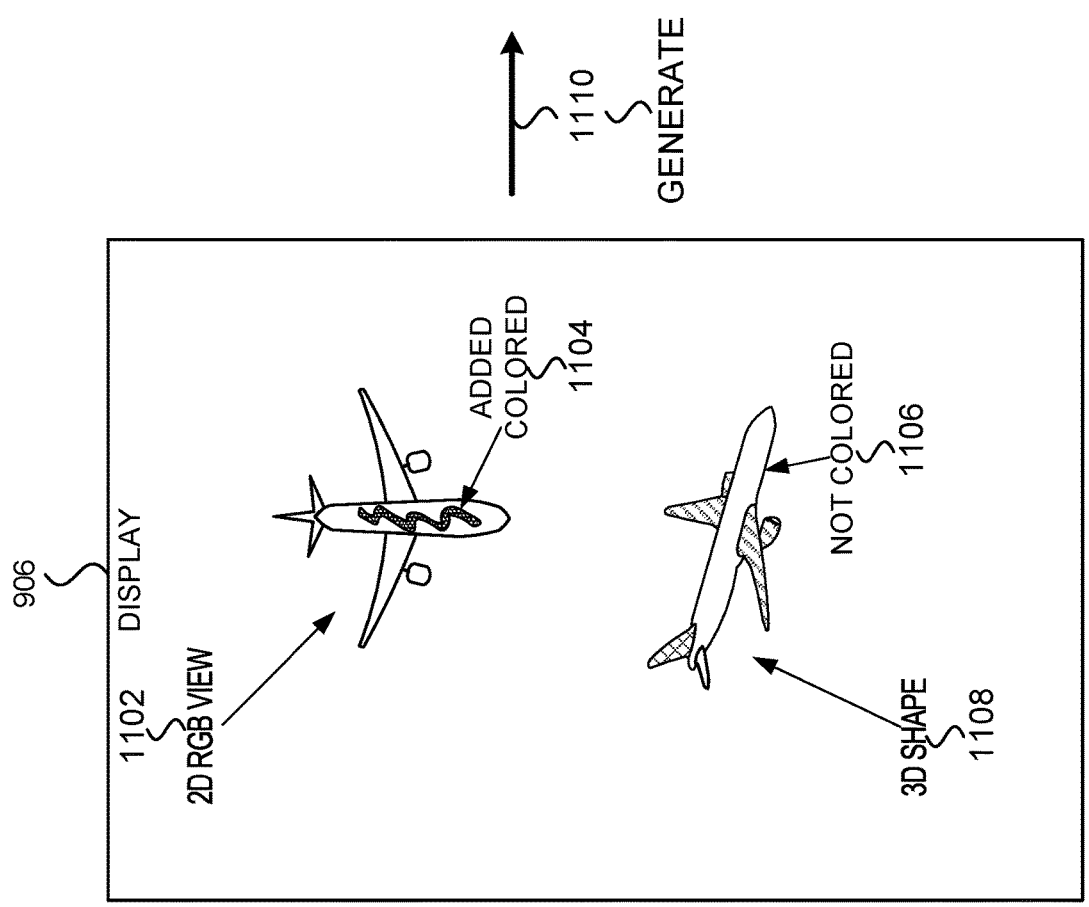

FIG. 11 illustrates an example 1100 of cross-modal shape and color manipulation, in accordance with some examples. In FIG. 11, the editing module 902 uses a latent code $z_0$ as z 703 to generate the 3D shape 1108 and the 2D RGB view 1102. The 2D RGB view 1102 has added color 1104 from edits of a user. The body of the 3D shape 1108 generated by the editing module 902 with $z_0$ is not colored 1106. After the user adds the added color 1104, the editing module 902 uses Equation (13) to determine $\hat{z}$ and then generates 1110 the 3D shape 1112 based on Equation (4) where the 3D shape 1112 is colored 1114 based on the added color 1104. In some examples, when additional 2D RGB views 1102 are presented of airplanes, the editing module 902 learns the mapping function $h_\omega(z)$ based on Equation (16) and uses $h_\omega(z)$ for z to determine $\hat{z}$ based on Equation (15). The editing module 902 then generates 1110 the 3D shape 1112 based on Equation (4) with z substituted by $h_\omega(z)$. The editing module 902 enabled the user to edit the 3D shape 1108 by editing the 2D RGB view 1102. In some examples, the editing module 902 generates a new 2D RGB view so that it is colored based on $\hat{z}$ or $h_\omega(z)$ and presents the new 2D RGB view with the 3D shape 1112.

Figure 12:
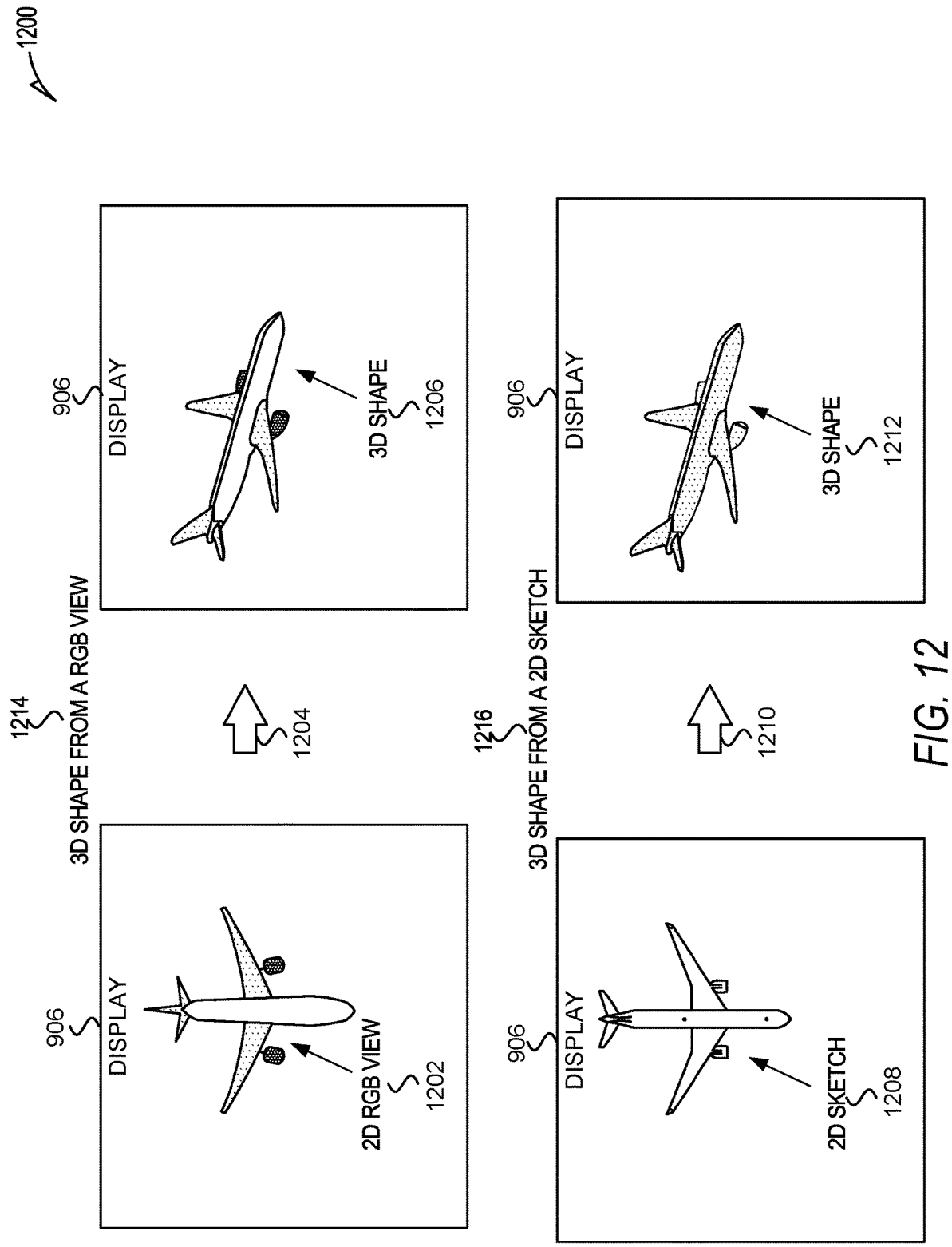
FIG. 12 illustrates examples of cross-modal shape and color manipulation, in accordance with some examples.

FIG. 12 illustrates examples 1200 of cross-modal shape and color manipulation, in accordance with some examples. A user generates a 3D shape from a RGB view 1214 as follows. A user sketches a 2D RGB view 1202 and the editing module 902 determines a z based on Equation (15) that generates the 2D RGB view 1202. The editing module 902 then generates 1204 the 3D shape 1206 based on z and Equation (4). A user generates a 3D shape from a 2D sketch 1216 as follows. A user sketches a 2D sketch 1208 and the editing module 902 determines a z based on Equation (15) that generates the 2D sketch 1208. The editing module 902 then generates 1210 the 3D shape 1212 based on z and Equation (4).

Figure 13:
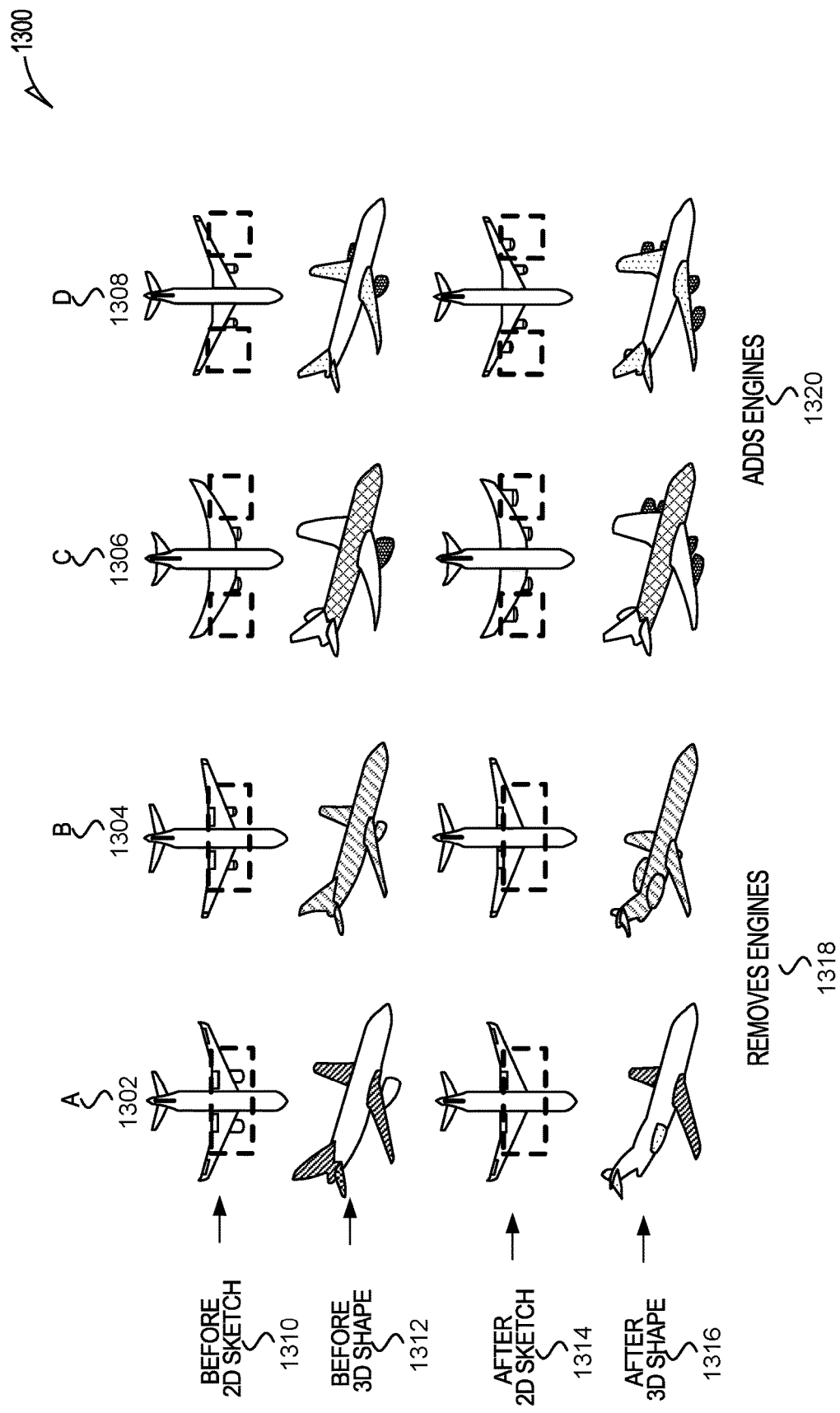
FIG. 13 illustrates examples of cross-modal shape and color manipulations, in accordance with some examples.

FIG. 13 illustrates examples 1300 of cross-modal shape and color manipulations, in accordance with some examples. A user edits the row of before 2D sketches 1310 within the dashed rectangles and the editing module 902 generates the row of after 3D shapes 1316, which indicates the changes made to the before 3D shape 1312 by the user's editing. The edits can be seen by comparing the before 2D sketch 1310 with the after 2D sketch 1314. In the examples of columns A 1302 and B 1304 the user removes engines 1318 and in the columns of examples C 1306 and D 1308 the user adds engines 1320. In example B 1304, the editing module 902 generated after 3D shape 1316 with new engines on the rear of the airplane, which indicates that in the latent space Z 602 there are not airplanes without engines or there are only a few airplanes without engines.

Figure 14:
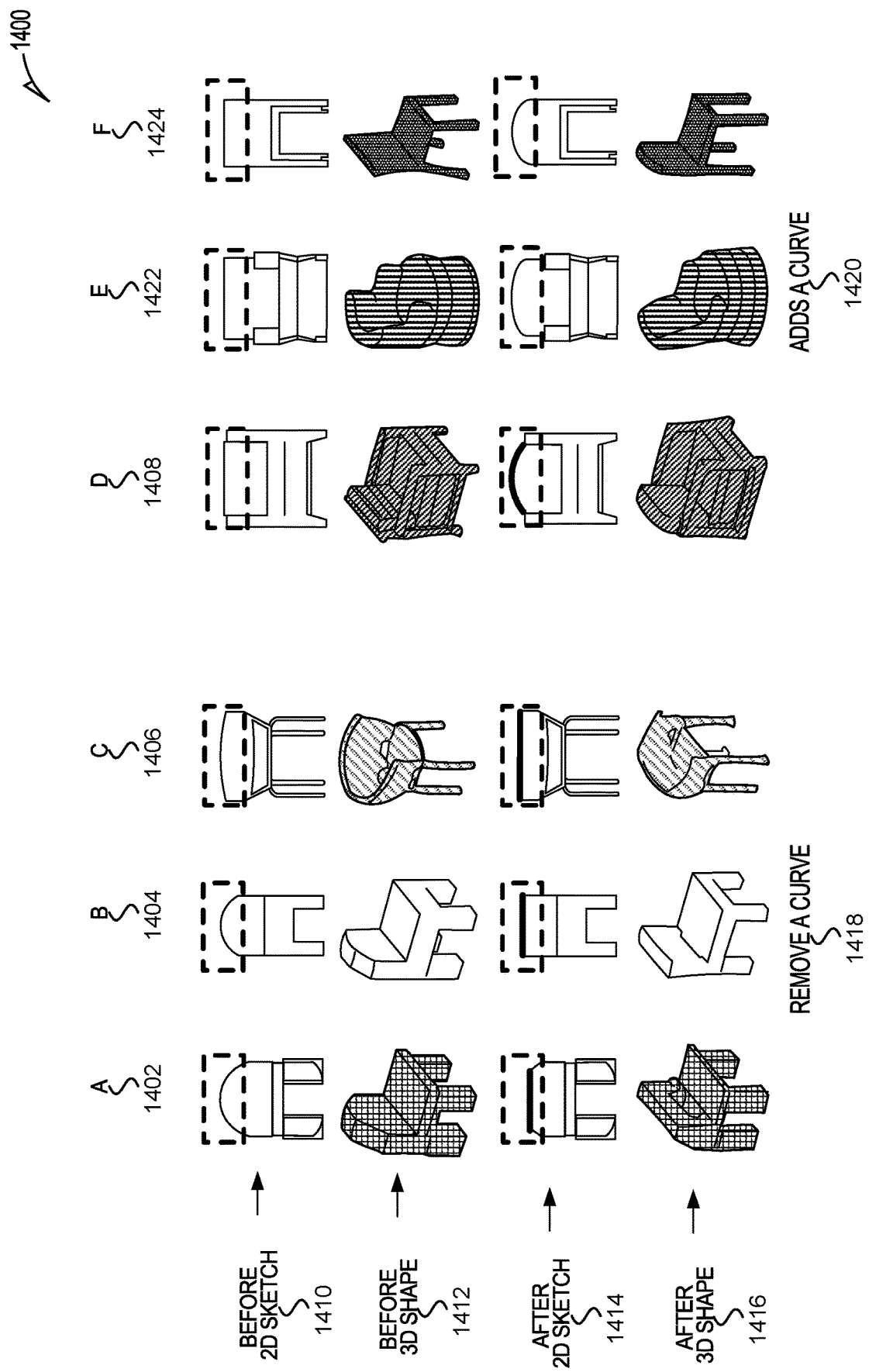
FIG. 14 illustrates examples of cross-modal shape and color manipulations, in accordance with some examples.

FIG. 14 illustrates examples 1400 of cross-modal shape and color manipulations, in accordance with some examples. A user edits the row of before 2D sketches 1410 within the dashed rectangles and the editing module 902 generates the row of after 3D shapes 1416, which indicate the changes made to the corresponding before 3D shape 1412 by the user's editing. The edits can be seen by comparing the row of before 2D sketches 1410 with the row of after 2D sketches 1414. In the examples of columns A 1402, B 1404, and C 1406 the user removes a curve 1418 and in the examples of columns D 1408, E 1422, and F 1424 the user adds a curve 1420.

Figure 15:
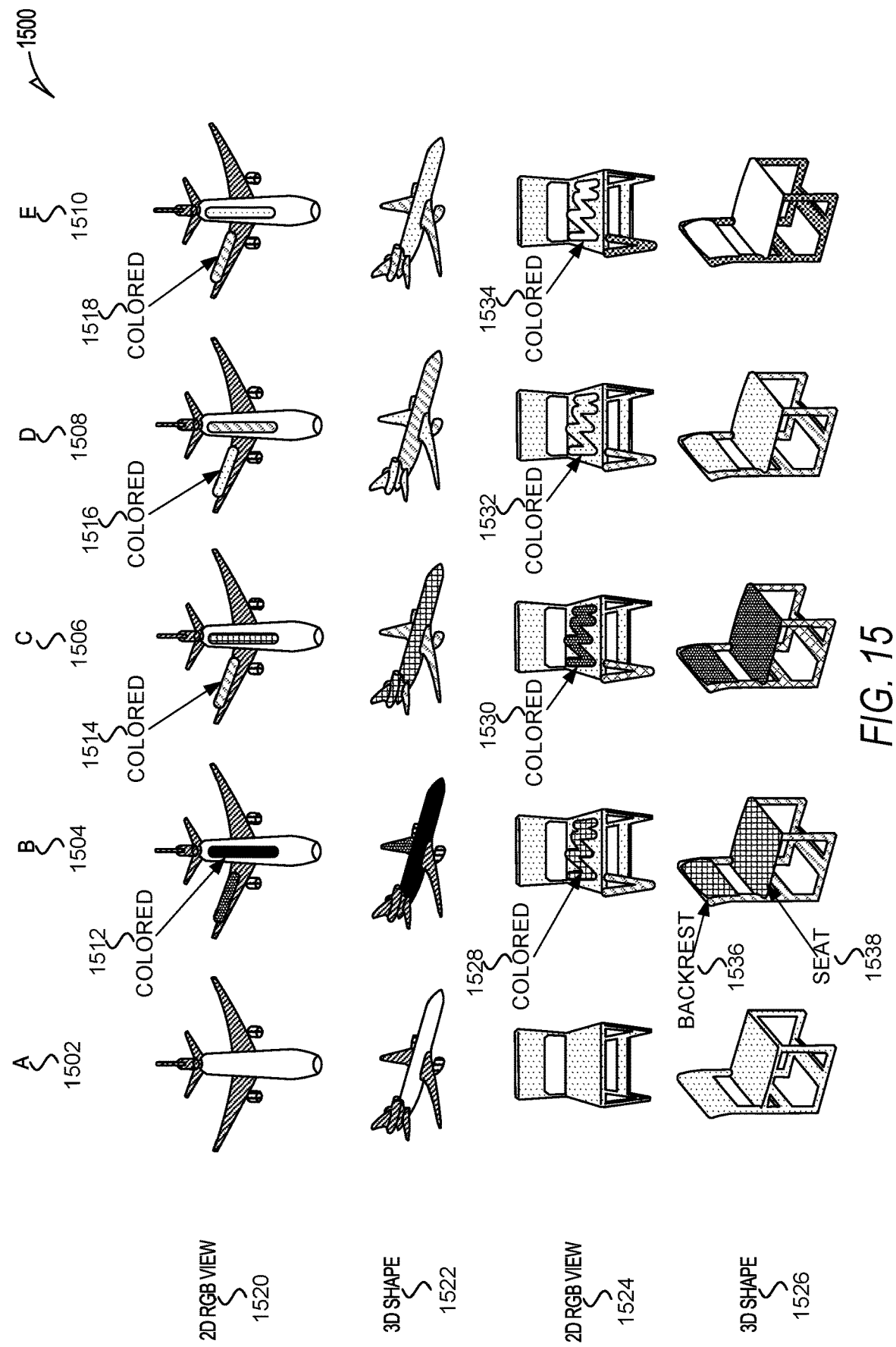
FIG. 15 illustrates examples of cross-modal shape and color manipulations, in accordance with some examples.

FIG. 15 illustrates examples 1500 of cross-modal shape and color manipulations, in accordance with some examples. Column A 1502 is before a user adds any colors. The columns B 1504, C 1506, D 1508, and E 1510 have edits where color is added to the 2D RGB view 1520, at colored 1512, 1514, 1516, and 1518, respectively, and the 2D RGB view 1524, at colored 1528, 1530, 1532, and 1534, respectively. The row 3D shapes 1522 illustrates the shapes generated by the editing module 902 based on the latent code z of the corresponding shape of the row of 2D RGB views 1520. The row 3D shapes 1526 illustrates the shapes generated by the editing module 902 based on the latent code z of the corresponding shape of the row of 2D RGB views 1520. The change in the 3D shape 1522, 1526 can be discerned by comparing the 3D shape 1522, 1526 with the 3D shape 1522, 1526 of column A 1502. For example, a user added colored 1512 to 2D RGB view 1520 in column B 1504. The editing module 902 generated 3D shape 1522 in column B 1504 based on the latent code z that would generate the 2D RGB view 1520 of column B. By comparing the 3D shape 1522 in column A 1502 with the 3D shape 1522 in column B one can discern that the body of the airplane has been colored with the color used by the user at colored 1512. The colored 1514 on the right wing of the airplane in column C 1506 of row 2D RGB view 1520 changes the color of both wings of the airplane as illustrated in column C 1506 of row 3D shapes 1522. Similarly, colored 1516, and colored 1518 both change the color of both wings of the airplane in the airplane that the editing module 902 generates in column D 1508 and column E 1510 of the row of 3D shapes 1522, respectively. Similarly, the colored 1528, 1530, 1532, and 1534 on the seat of the chairs of the 2D RGB views 1524 cause the 3D shapes 1526 generated by the editing module 902 to have the color changed on both the seat 1538 and on the backrest 1536. This is likely due to the latent space Z 602 not having many examples of chairs with different colors for the seat and the backrest.

Figure 16:
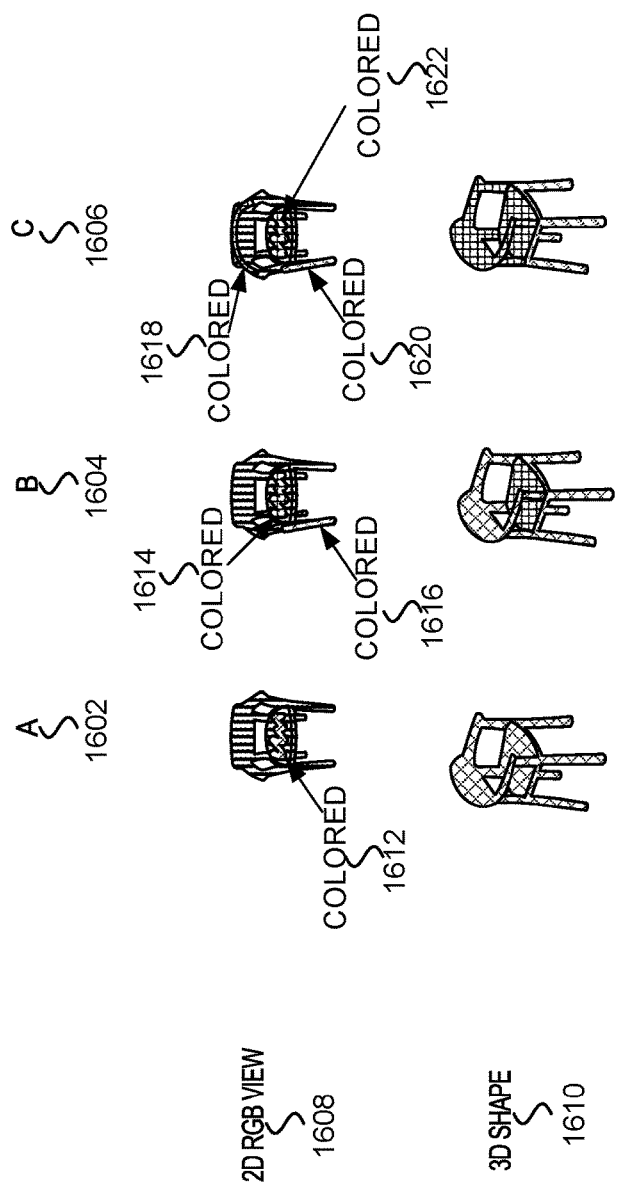
FIG. 16 illustrates examples of cross-modal shape and color manipulations, in accordance with some examples.

FIG. 16 illustrates examples 1600 of cross-modal shape and color manipulations, in accordance with some examples. The 2D RGB views 1608 are provided for a user by the editing module 902. The 3D shapes 1610 are generated by the editing module 902 based on the latent space Z 602 and the 2D RGB views 1608 with the edits of colored 1612, 1615, 1616, 1618 1620, and 1622 as described herein. In column A 1602, a user colored 1612 the seat bottom of a chair that was a striped color overall and the resulting 3D shape 1610 in column A 1602 is that the entire chair has been colored with the color of colored 1612.

In column B 1604, a user colored 1614 the seat bottom and colored 1616 a leg of the chair. The resulting 3D shape 1610 in column B 1604 is that the chair is all the color of the colored 1616 except for the seat bottom which has a color of colored 1614.

In column C 1606, a user colored 1618 a stroke of color that goes across the backrest and both arms of the chair, colored 1620 the leg of the chair, and colored 1622 the seat bottom with a same color as colored 1618. The resulting 3D shape 1610 in column C 1606 has a seat bottom, backrest, and arms with the color of colored 1618, 1622, and legs with the color of colored 1620.

Figure 17:
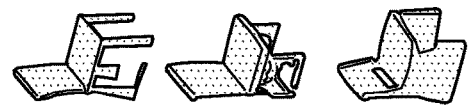
FIG. 17 illustrates an example of the effects of occlusion on shape generation, in accordance with some examples.
Figure 17:
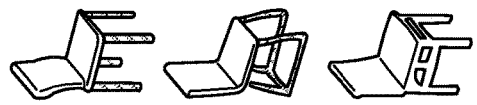
Figure 17:
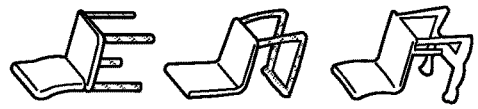
Figure 17:
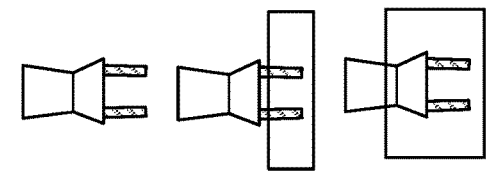
Figure 17:
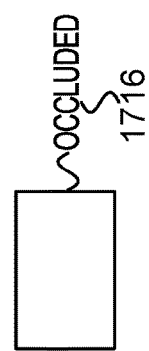

FIG. 17 illustrates an example 1700 of the effects of occlusion on shape generation, in accordance with some examples. The rows illustrate different percentages of occlusion of the 2D sketch 1708 where the rectangle 1716 indicates the portion of the 2D sketch 1708 that is occluded. In row A 1702 none of the 2D sketch 1708 is occluded. In row B 1704 about 40% of the 2D sketch 1708 is occluded. In row C 1706 about 60% of the 2D sketch 1708 is occluded. The column 3D shape 1 1710 is the non-occluded portion of the 2D sketch 1708 generated into the 3D shape 1 1710 by the editing module 902 based on the latent space Z 602 as described herein. The column labeled 3D shape 2 1712 is the same as 3D shape 1 1710 with the editing module 902 performing a second generation of determining a latent code z based on determining a latent code for the column labeled 2D sketch 1708 and the column labeled 3D shape 1 1710. Encoder-decoder (Enc-dec) 1714 indicates a traditional method of encoders and decoders for generating the 3D shape.

Figure 18:
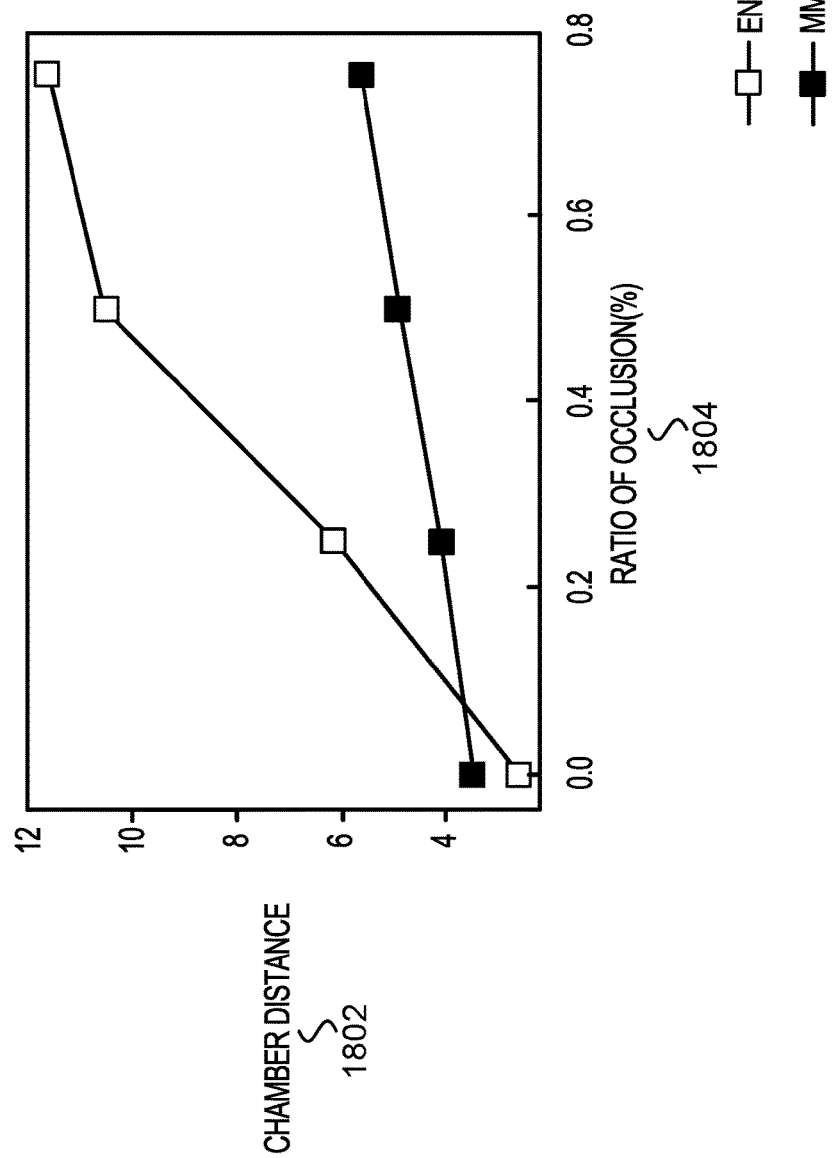
FIG. 18 illustrates a graph comparing encoder-decoders with MM-VADs, in accordance with some examples.

FIG. 18 illustrates a graph 1800 comparing encoder-decoders with MM-VADs, in accordance with some examples. The vertical axis is the Chamber distance 1802 where a lower number is better. The Chambers distance 1802 is measuring a loss between the 2D sketch 1708 of row A 1702 with the 3D shape 1 1710, the 3D shape 2 1712, and the Enc-Dec 1714 for different ratios of occlusion 1804. The MM-VAD 1808 preforms better than encoder-decoder 1806 with lower Chamber distance 1802 numbers.

Figure 19:
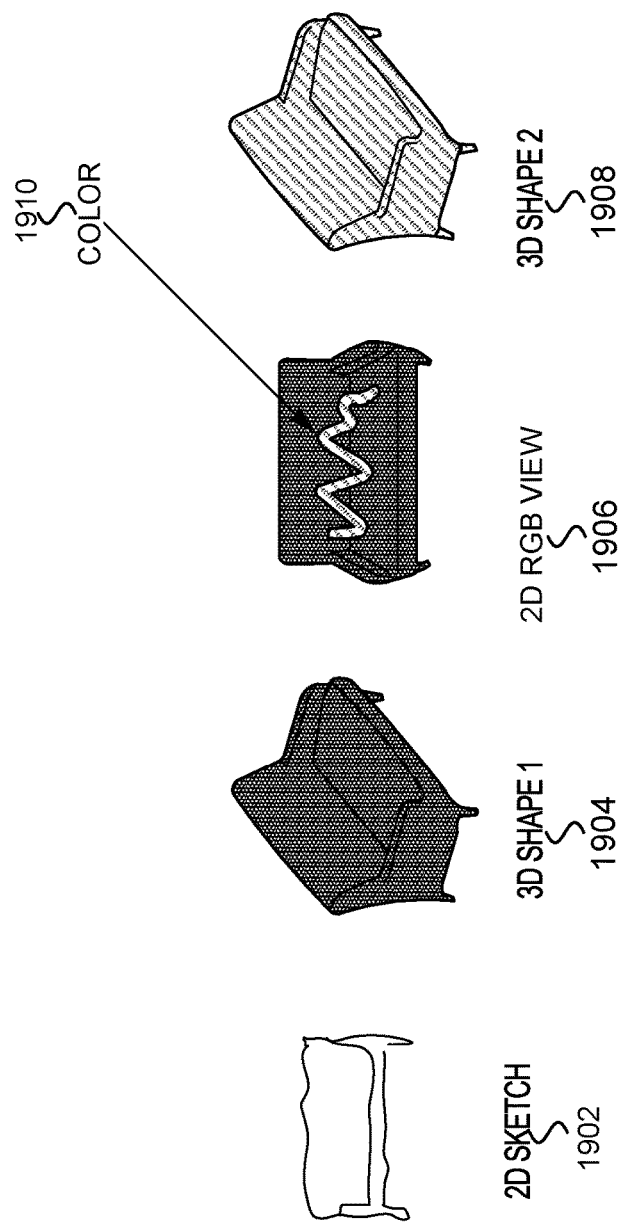
FIG. 19 illustrates examples of cross-modal shape and color manipulations, in accordance with some examples.

FIG. 19 illustrates examples 1900 of cross-modal shape and color manipulations, in accordance with some examples. The editing module 902 provides an editor for a user to draw 2D sketch 1902. The editing module 902 based on the latent space Z 602 generates 3D shape 1 1904 and 2D RGB view 1906 from the 2D sketch 1902 as described herein. The user colors color 1910 the 2D RGB view 1906. The editing module 902 generates 3D shape 2 1908 based on the latent space Z 602 and the 2D RGB view 1906 with color 1910 as described herein.

Figure 20:
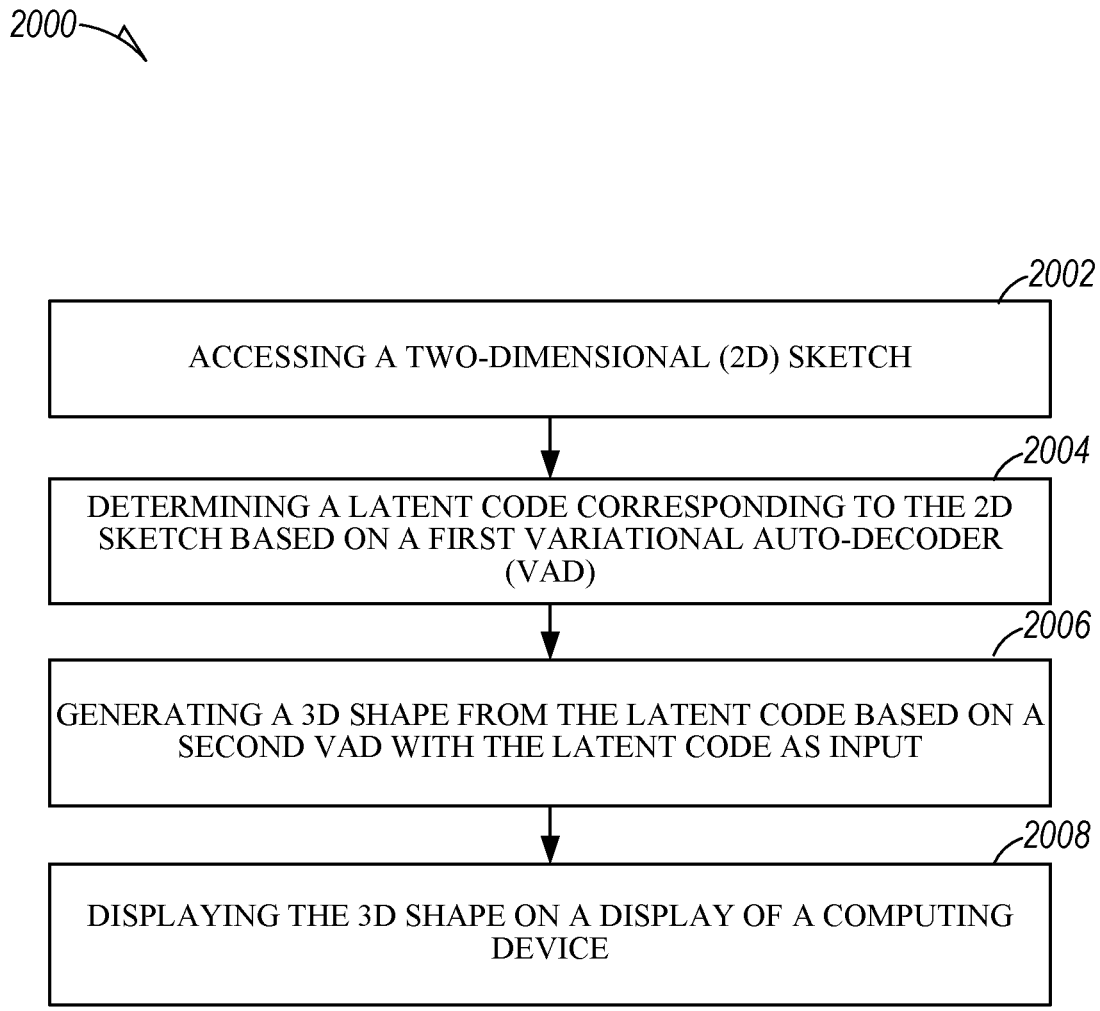
FIG. 20 illustrates a method for cross-modal shape and color manipulations, in accordance with some examples.

FIG. 20 illustrates a method 2000 for cross-modal shape and color manipulations, in accordance with some examples. The method 2000 begins at operation 2002 with accessing a 2D sketch. For example, the editing module 902 may access a 2D sketch 1902 that is drawn by a user. The method 2000 continues at operation 2004 with determining a latent code corresponding to the 2D sketch based on a first VAD. For example, the editing module 902 determines a value of z 703 based on Equation (17) that when input to the MM generator 701 at $\mathcal{G}^S$ 712 generates a 2D sketch 808 that is close to the 2D sketch 1902 that was drawn by the user. The method 2000 continues at operation 2006 with generating a 3D shape from the latent code based on a second VAD with the latent code as input. For example, the editing module 902 generates 3D shape 912 using the MM generator 701 at $\mathcal{G}^C$ 607 with the latent code as input. The method 2000 continues at operation 2008 with displaying the 3D shape on a display of a computing device. For example, the editing module 902 may display 3D shape 1 1904 on a display 906.

Machine Architecture

Figure 21:
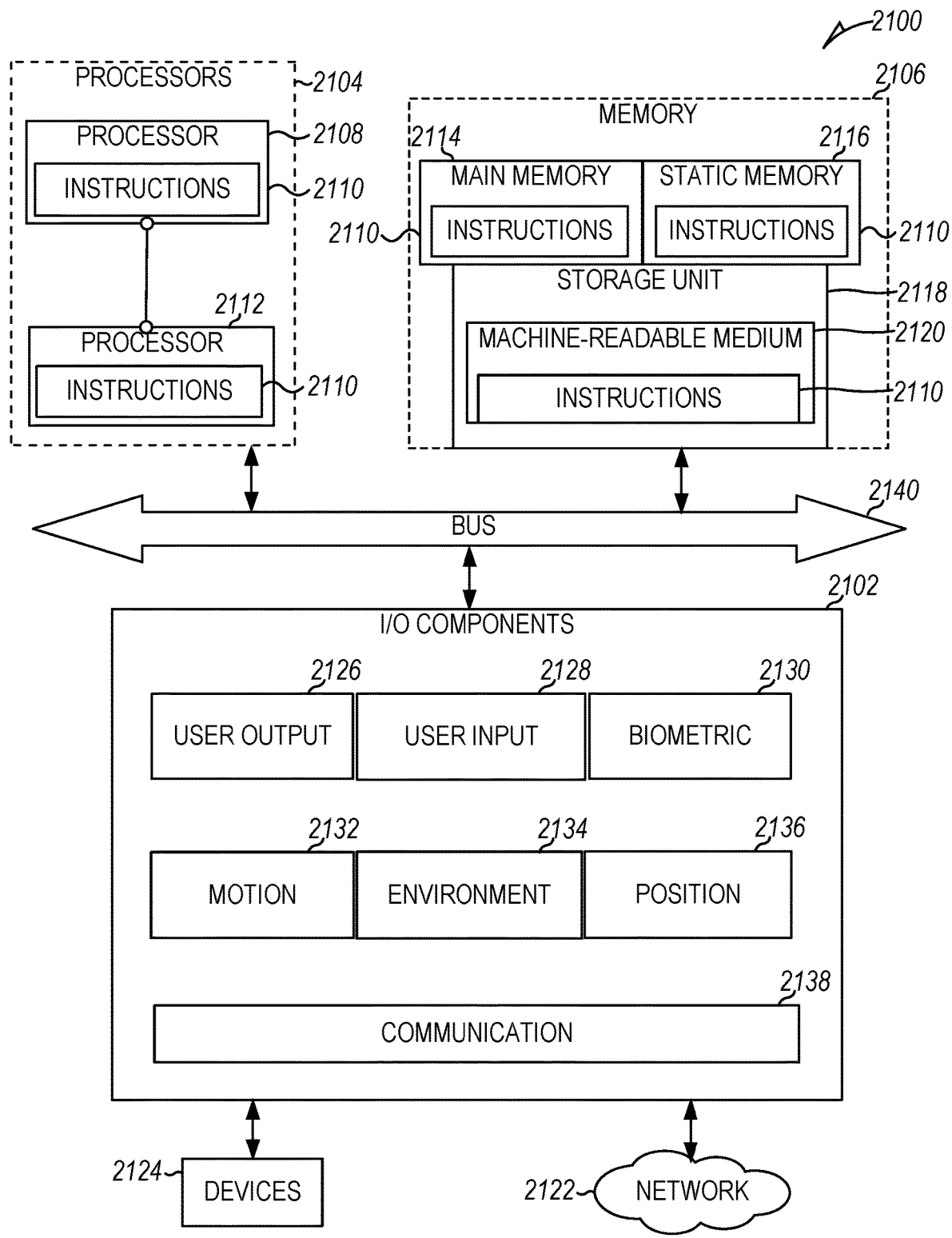
FIG. 21 is a diagrammatic representation of a machine in the form of a computer system within which a set of instructions may be executed for causing the machine to perform any one or more of the methodologies discussed herein, in accordance with some examples.

FIG. 21 is a diagrammatic representation of the machine 2100 within which instructions 2110 (e.g., software, a program, an application, an applet, an app, or other executable code) for causing the machine 2100 to perform any one or more of the methodologies discussed herein may be executed. For example, the instructions 2110 may cause the machine 2100 to execute any one or more of the methods described herein. The instructions 2110 transform the general, non-programmed machine 2100 into a particular machine 2100 programmed to carry out the described and illustrated functions in the manner described. The machine 2100 may operate as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2110, sequentially or otherwise, that specify actions to be taken by the machine 2100. Further, while only a single machine 2100 is illustrated, the term "machine" shall also be taken to include a collection of machines that individually or jointly execute the instructions 2110 to perform any one or more of the methodologies discussed herein. The machine 2100, for example, may comprise the client device 102 or any one of a number of server devices forming part of the messaging server system 108. In some examples, the machine 2100 may also comprise both client and server systems, with certain operations of a particular method or algorithm being performed on the server-side and with certain operations of the particular method or algorithm being performed on the client-side.

The machine 2100 may include processors 2104, memory 2106, and input/output I/O components 2102, which may be configured to communicate with each other via a bus 2140. In an example, the processors 2104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2108 and a processor 2112 that execute the instructions 2110. The term "processor" is intended to include multi-core processors that may comprise two or more independent processors (sometimes referred to as "cores") that may execute instructions contemporaneously. Although FIG. 21 shows multiple processors 2104, the machine 2100 may include a single processor with a single-core, a single processor with multiple cores (e.g., a multi-core processor), multiple processors with a single core, multiple processors with multiples cores, or any combination thereof.

The memory 2106 includes a main memory 2114, a static memory 2116, and a storage unit 2118, both accessible to the processors 2104 via the bus 2140. The main memory 2106, the static memory 2116, and storage unit 2118 store the instructions 2110 embodying any one or more of the methodologies or functions described herein. The instructions 2110 may also reside, completely or partially, within the main memory 2114, within the static memory 2116, within machine-readable medium 2120 within the storage unit 2118, within at least one of the processors 2104 (e.g., within the Processor's cache memory), or any suitable combination thereof, during execution thereof by the machine 2100.

The I/O components 2102 may include a wide variety of components to receive input, provide output, produce output, transmit information, exchange information, capture measurements, and so on. The specific I/O components 2102 that are included in a particular machine will depend on the type of machine. For example, portable machines such as mobile phones may include a touch input device or other such input mechanisms, while a headless server machine will likely not include such a touch input device. It will be appreciated that the I/O components 2102 may include many other components that are not shown in FIG. 21. In various examples, the I/O components 2102 may include user output components 2126 and user input components 2128. The user output components 2126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2102 may include biometric components 2130, motion components 2132, environmental components 2134, or position components 2136, among a wide array of other components. For example, the biometric components 2130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2132 include acceleration sensor components (e.g., accelerometer), gravitation sensor components, rotation sensor components (e.g., gyroscope).

The environmental components 2134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2102 further include communication components 2138 operable to couple the machine 2100 to a network 2122 or devices 2124 via respective coupling or connections. For example, the communication components 2138 may include a network interface Component or another suitable device to interface with the network 2122. In further examples, the communication components 2138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2124 may be another machine or any of a wide variety of peripheral devices (e.g., a peripheral device coupled via a USB).

Moreover, the communication components 2138 may detect identifiers or include components operable to detect identifiers. For example, the communication components 2138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2138, such as location via Internet Protocol (IP) geolocation, location via Wi-Fi® signal triangulation, location via detecting an NFC beacon signal that may indicate a particular location, and so forth.

The various memories (e.g., main memory 2114, static memory 2116, and memory of the processors 2104) and storage unit 2118 may store one or more sets of instructions and data structures (e.g., software) embodying or used by any one or more of the methodologies or functions described herein. These instructions (e.g., the instructions 2110), when executed by processors 2104, cause various operations to implement the disclosed examples.

The instructions 2110 may be transmitted or received over the network 2122, using a transmission medium, via a network interface device (e.g., a network interface component included in the communication components 2138) and using any one of several well-known transfer protocols (e.g., hypertext transfer protocol (HTTP)). Similarly, the instructions 2110 may be transmitted or received using a transmission medium via a coupling (e.g., a peer-to-peer coupling) to the devices 2124.

Software Architecture

Figure 22:
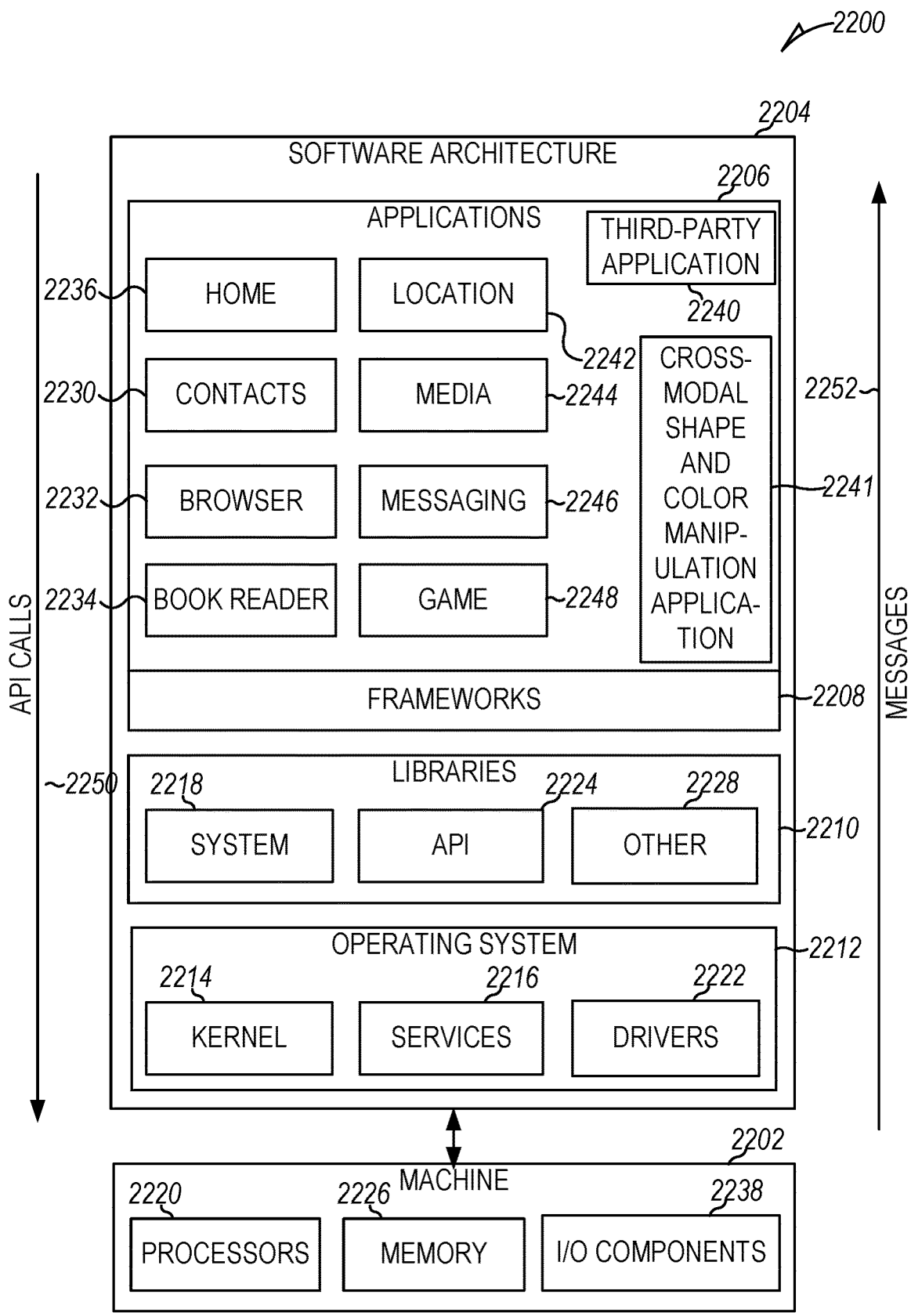
FIG. 22 is a block diagram showing a software architecture within which examples may be implemented.

FIG. 22 is a block diagram 2200 illustrating a software architecture 2204, which can be installed on any one or more of the devices described herein. The software architecture 2204 is supported by hardware such as a machine 2202 that includes processors 2220, memory 2226, and I/O components 2238. In this example, the software architecture 2204 can be conceptualized as a stack of layers, where each layer provides a particular functionality. The software architecture 2204 includes layers such as an operating system 2212, libraries 2210, frameworks 2208, and applications 2206. Operationally, the applications 2206 invoke API calls 2250 through the software stack and receive messages 2252 in response to the API calls 2250.

The operating system 2212 manages hardware resources and provides common services. The operating system 2212 includes, for example, a kernel 2214, services 2216, and drivers 2222. The kernel 2214 acts as an abstraction layer between the hardware and the other software layers. For example, the kernel 2214 provides memory management, processor management (e.g., scheduling), component management, networking, and security settings, among other functionality. The services 2216 can provide other common services for the other software layers. The drivers 2222 are responsible for controlling or interfacing with the underlying hardware. For instance, the drivers 2222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2210 provide a common low-level infrastructure used by the applications 2206. The libraries 2210 can include system libraries 2218 (e.g., C standard library) that provide functions such as memory allocation functions, string manipulation functions, mathematic functions, and the like. In addition, the libraries 2210 can include API libraries 2224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2210 can also include a wide variety of other libraries 2228 to provide many other APIs to the applications 2206.

The frameworks 2208 provide a common high-level infrastructure that is used by the applications 2206. For example, the frameworks 2208 provide various graphical user interface (GUI) functions, high-level resource management, and high-level location services. The frameworks 2208 can provide a broad spectrum of other APIs that can be used by the applications 2206, some of which may be specific to a particular operating system or platform.

In an example, the applications 2206 may include a home application 2236, a contacts application 2230, a browser application 2232, a book reader application 2234, a location application 2242, a media application 2244, a messaging application 2246, a game application 2248, and a broad assortment of other applications such as a third-party application 2240. The cross-modal shape and color manipulation application 2241 generates images such as the images described in conjunction with FIG. 9 and herein. Additionally, the cross-modal shape and color manipulation application 2241 provides one or more of the functions or services provided by the cross-modal shape and color manipulation system 216. The applications 2206 are programs that execute functions defined in the programs. Various programming languages can be employed to create one or more of the applications 2206, structured in a variety of manners, such as object-oriented programming languages (e.g., Objective-C, Java, or C++) or procedural programming languages (e.g., C or assembly language). In a specific example, the third-party application 2240 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 2240 can invoke the API calls 2250 provided by the operating system 2212 to facilitate functionality described herein.

Processing Components

Figure 23:
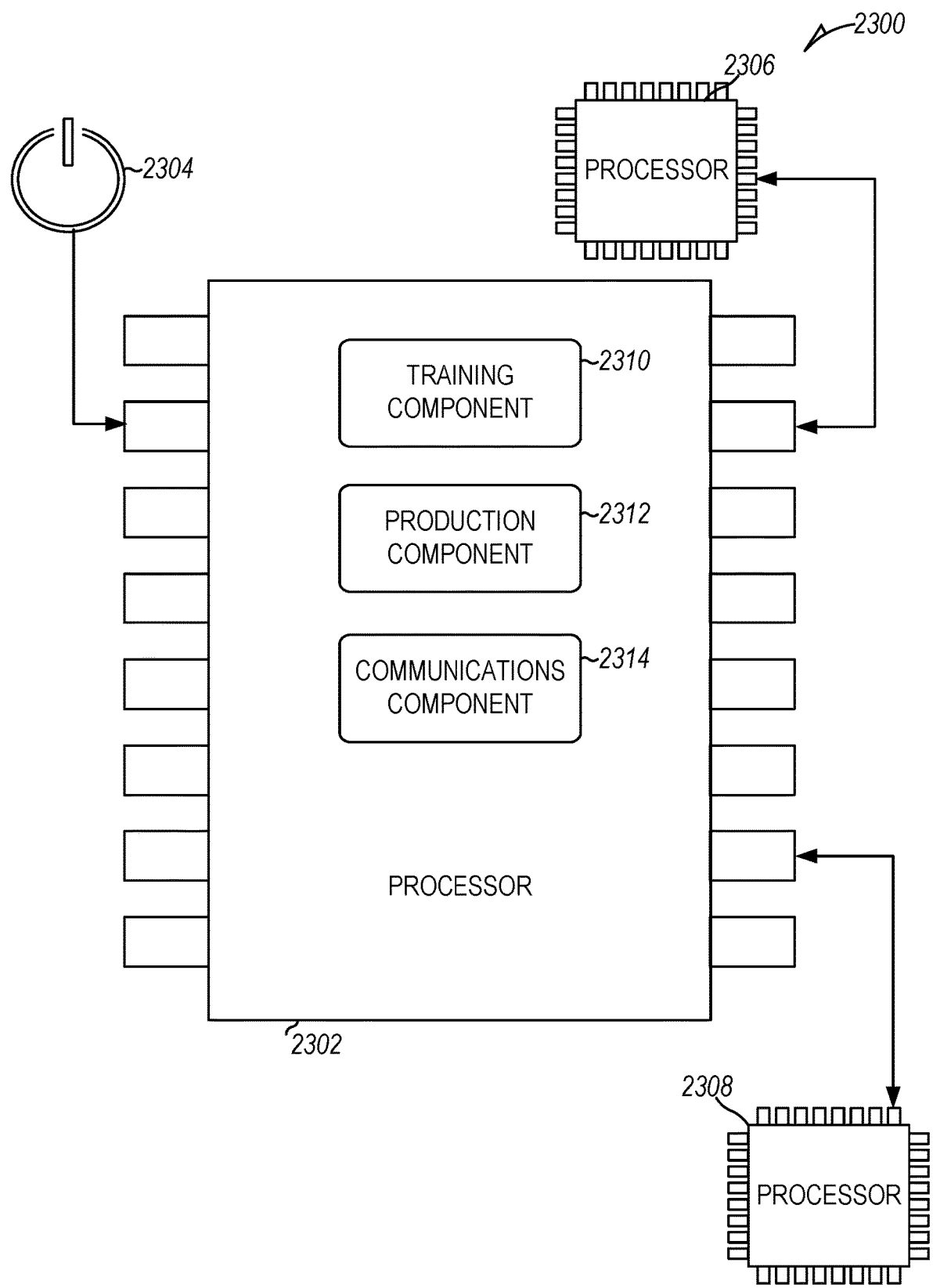
FIG. 23 is a diagrammatic representation of a processing environment, in accordance with some examples.

Turning now to FIG. 23 there is shown a diagrammatic representation of a processing environment 2300, which includes a processor 2302, a processor 2306, and a processor 2308 (e.g., a GPU, CPU or combination thereof).

The processor 2302 is shown to be coupled to a power source 2304, and to include (either permanently configured or temporarily instantiated) modules, namely a training component 2310, a production component 2312, and a communications component 2314. The training component 2310 trains the neural networks such as MM encoder 824 and MM generator 701. The production component 2312 implements the functions of an interface for a user to use the trained MM generator 701 such as editing module 902. For example, the interface is illustrated in FIG. 11 on a display 906. The communications component 2312 may be tied back to the messaging server system 108 to retrieve a trained MM encoder 824 and/or a trained MM generator 701 as well as to provide additional functions.

GLOSSARY

"Modules" refers to any logic, components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   accessing a first two-dimensional (2D) sketch;
   determining, by one or more processors, a first latent code corresponding to the first 2D sketch based on a first variational auto-decoder (VAD);
   generating a second 2D sketch based on the first VAD with the first latent code as input;
   causing the second 2D sketch to be displayed;
   determining the second 2D sketch has been edited;
   determining a second latent code corresponding to the edited 2D sketch based on the first VAD;
   generating a three-dimensional (3D) shape from the second latent code based on a second VAD with the second latent code as input; and
   causing to be displayed the 3D shape on the display of a computing device.

2. The method of claim 1 wherein determining the second latent code further comprises:
   generating a third 2D sketch based on the first VAD with the second latent code as input;
   determining a loss between the third 2D sketch and the second 2D sketch; and
   in response to the loss being less than a threshold, determining to use the second latent code for the second 2D sketch.

3. The method of claim 2 wherein the second latent code comprises a color latent code and a shape latent code.

4. The method of claim 3 wherein the second 2D sketch is generated with only the shape latent code of the second latent code and the 3D shape is generated with both the color latent code and the shape latent code.

5. The method of claim 3 wherein the second VAD comprises a third VAD and fourth VAD, and wherein the generating the 3D shape further comprises:
   generating a three-dimensional (3D) color based on the third VAD with the color latent code as input;
   generating a signed distance field (SDF) based on the fourth VAD with the shape latent code as input; and
   combining the 3D color and the SDF to generate the 3D shape.

6. The method of claim 2 wherein the threshold is a first threshold, the loss is a first loss, and wherein the method further comprises:
   determining a loss between a previous latent code and the first latent code; and, wherein the in response to the loss further comprises:
   in response to the first loss being less than the first threshold and the second loss being less than a second threshold, determining to use the first latent code for the first 2D sketch.

7. The method of claim 1 wherein the 3D shape is a first 3D shape and wherein the method further comprises:
   generating a second 3D shape from the first latent code based on the second VAD with the first latent code as input; and
   displaying the second 3D shape on a display of a computing device.

8. The method of claim 1 further comprising:
   generating a 2D color view based on a third VAD with the first latent code and a view as input; and
   displaying the 2D color view on the display of the computing device.

9. The method of claim 8 wherein the 2D color view is a first 2D color view, the 3D shape is a first 3D shape, and wherein the method further comprises:
   determining the first 2D color view comprises edits;
   determining a third latent code corresponding to the edited 2D color view based on the third VAD;
   generating a second 2D color view based on the third VAD with the third latent code as input;
   generating a third 2D sketch based on the first VAD with the third latent code as input;
   generating a second 3D shape based on the third VAD with the third latent code as input; and
   displaying the second 2D color view, the third 2D sketch, and the second 3D shape on the display of the computing device.

10. The method of claim 9 wherein the edits of the first 2D color view are edits that change the color of the first 2D color view.

11. The method of claim 1 wherein determining the first latent code further comprises:
   determining a plurality of latent codes based on a loss between the first 2D sketch and a plurality of 2D sketches generated from the plurality of latent codes;
   generating a plurality of 3D shapes based on the second VAD with the plurality of latent codes as inputs;
   displaying the plurality of 3D shapes on the display of the computing device; and
   in response to a selection of a 3D shape of the plurality of 3D shapes, determining a corresponding latent code of the plurality of latent codes used as input to generate the selected 3D shape is the first latent code.

12. The method of claim 1 wherein the method further comprises:
   generating a third latent code based on a first variational auto-encoder (VAE) with a ground truth 2D sketch as input;
   generating a third 2D sketch based on the first VAD with the third latent code as input; and
   adjusting weights of the first VAD and the first VAE based on a difference between the third 2D sketch and the ground truth 2D sketch.

13. The method of claim 12 wherein the 3D shape is a first 3D shape and wherein the method further comprises:
   generating a fourth latent code based on a second VAE with a ground truth 3D shape as input, wherein the ground truth 3D shape and the ground truth 2D sketch are a matched pair;
   generating a second 3D shape based on the second VAD with the fourth latent code as input; and
   adjusting weights of the second VAD and the second VAE based on a difference between the second 3D shape and the ground truth 3D shape.

14. The method of claim 1 wherein the first VAD and the second VAD are fully connected neural networks with three to eight layers and wherein the first VAD and the second VAD are trained based on matched pairs of 2D sketches and corresponding 3D shapes.

15. The method of claim 1 further comprising:
   training the first VAD and the second VAD to learn a mapping between a latent space comprising the first latent code and a second latent space wherein latent codes of a plurality of 2D sketches depicting a same 3D shape map to a same area of the second latent space.

16. A non-transitory computer-readable storage medium, the computer-readable storage medium including instructions that when executed by one or more processors, cause the one or more processors to perform operations comprising:
   accessing a first two-dimensional (2D) sketch;
   determining, by one or more processors, a first latent code corresponding to the first 2D sketch based on a first variational auto-decoder (VAD);
   generating a second 2D sketch based on the first VAD with the first latent code as input;
   causing the second 2D sketch to be displayed;
   determining the second 2D sketch has been edited;
   determining a second latent code corresponding to the edited 2D sketch based on the first VAD;
   generating a three-dimensional (3D) shape from the second latent code based on a second VAD with the second latent code as input; and
   causing to be displayed the 3D shape on the display of a computing device.

17. The computer-readable storage medium of claim 16, wherein the determining the second latent code further comprises:
   generating a third 2D sketch based on the first VAD with the second latent code as input;
   determining a loss between the third 2D sketch and the second 2D sketch; and
   in response to the loss being less than a threshold, determining to use the second latent code for the second 2D sketch.

18. A system comprising:
   one or more processors; and
   a memory storing instructions that, when executed by the one or more processors, configure the system to perform operations comprising:
   accessing a first two-dimensional (2D) sketch;
   determining, by one or more processors, a first latent code corresponding to the first 2D sketch based on a first variational auto-decoder (VAD);
   generating a second 2D sketch based on the first VAD with the first latent code as input;
   causing the second 2D sketch to be displayed;
   determining the second 2D sketch has been edited;
   determining a second latent code corresponding to the edited 2D sketch based on the first VAD;
   generating a three-dimensional (3D) shape from the second latent code based on a second VAD with the second latent code as input; and
   causing to be displayed the 3D shape on the display of a computing device.

19. The system of claim 18 wherein the determining the second latent code further comprises:
   generating a third 2D sketch based on the first VAD with the second latent code as input;
   determining a loss between the third 2D sketch and the second 2D sketch; and
   in response to the loss being less than a threshold, determining to use the second latent code for the second 2D sketch.

* * * * *